United States Patent
Banno et al.

(10) Patent No.: US 10,936,888 B2
(45) Date of Patent: Mar. 2, 2021

(54) APPARATUS DETECTING DRIVING INCAPABILITY STATE OF DRIVER

(71) Applicant: DENSO CORPORATION, Kariya (JP)

(72) Inventors: Hiroto Banno, Kariya (JP); Takuhiro Omi, Kariya (JP); Yutaka Munaoka, Kariya (JP); Takeshi Enya, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/665,044

(22) Filed: Oct. 28, 2019

(65) Prior Publication Data

US 2020/0057898 A1    Feb. 20, 2020

Related U.S. Application Data

(63) Continuation of application No. 15/321,048, filed as application No. PCT/JP2015/002864 on Jun. 8, 2015, now Pat. No. 10,474,914.

(30) Foreign Application Priority Data

Jun. 23, 2014 (JP) .............................. JP2014-128387
Feb. 16, 2015 (JP) .............................. JP2015-028001

(51) Int. Cl.
*G06K 9/00* (2006.01)
*B60R 11/04* (2006.01)
(Continued)

(52) U.S. Cl.
CPC ........ *G06K 9/00845* (2013.01); *B60K 28/066* (2013.01); *B60R 11/04* (2013.01);
(Continued)

(58) Field of Classification Search
CPC .......... G06K 9/00845; G06K 2209/27; G06K 2209/40; G06K 9/00228; G06K 9/00281;
(Continued)

(56) References Cited

U.S. PATENT DOCUMENTS

| | | |
|---|---|---|
| 4,625,329 A | 11/1986 | Ishikawa et al. |
| 5,008,946 A | 4/1991 | Ando |

(Continued)

FOREIGN PATENT DOCUMENTS

| | | |
|---|---|---|
| CN | 103434400 A1 | 8/2013 |
| DE | 112011105432 T5 | 4/2014 |

(Continued)

OTHER PUBLICATIONS

U.S. Appl. No. 16/686,297, filed Nov. 18, 2019, Banno et al.

*Primary Examiner* — Manav Seth
(74) *Attorney, Agent, or Firm* — Harness, Dickey & Pierce, P.L.C.

(57) ABSTRACT

Apparatus detecting driving incapability state of a driver includes: a head detection portion that successively detects a head portion, which is higher than a neck of the driver, based on an image of a driver's seat captured by an imaging device mounted in a vehicle; and an out-of-frame state detection portion that detects that the driver is incapable of driving, when the head portion detected by the head detection portion is out of a predetermined scope in the image during travelling of the vehicle.

8 Claims, 15 Drawing Sheets

(51) Int. Cl.

| | | |
|---|---|---|
| *G06T 7/292* | (2017.01) | |
| *G06T 7/73* | (2017.01) | |
| *G06T 7/593* | (2017.01) | |
| *H04N 13/204* | (2018.01) | |
| *B60K 28/06* | (2006.01) | |
| *B60W 30/09* | (2012.01) | |
| *B60W 30/14* | (2006.01) | |
| *B60W 40/08* | (2012.01) | |
| *G06K 9/52* | (2006.01) | |
| *G08B 21/02* | (2006.01) | |
| *G08G 1/16* | (2006.01) | |
| *G08B 21/06* | (2006.01) | |

(52) U.S. Cl.
CPC ............ *B60W 30/09* (2013.01); *B60W 30/14* (2013.01); *B60W 40/08* (2013.01); *G06K 9/00228* (2013.01); *G06K 9/00281* (2013.01); *G06K 9/52* (2013.01); *G06T 7/292* (2017.01); *G06T 7/593* (2017.01); *G06T 7/73* (2017.01); *G08B 21/02* (2013.01); *H04N 13/204* (2018.05); *B60K 28/06* (2013.01); *B60W 2040/0818* (2013.01); *B60W 2420/42* (2013.01); *B60W 2540/043* (2020.02); *B60W 2540/10* (2013.01); *B60W 2540/12* (2013.01); *B60W 2540/18* (2013.01); *B60W 2554/00* (2020.02); *B60W 2554/80* (2020.02); *G06K 2209/27* (2013.01); *G06K 2209/40* (2013.01); *G06T 2207/10012* (2013.01); *G06T 2207/10016* (2013.01); *G06T 2207/10028* (2013.01); *G06T 2207/20081* (2013.01); *G06T 2207/30201* (2013.01); *G06T 2207/30241* (2013.01); *G06T 2207/30268* (2013.01); *G08B 21/06* (2013.01); *G08G 1/16* (2013.01)

(58) Field of Classification Search
CPC ........ G06K 9/52; H04N 13/204; B60R 11/04; B60K 28/06; B60K 28/066; B60W 2040/0818; B60W 2420/42; B60W 2540/10; B60W 2540/12; B60W 2540/18; B60W 30/09; B60W 30/14; B60W 40/08; B60W 2540/043; B60W 2554/00; B60W 2554/80; G06T 7/292; G06T 7/73; G06T 7/593; G06T 2207/10012; G06T 2207/10016; G06T 2207/10028; G06T 2207/20081; G06T 2207/30201; G06T 2207/30241; G06T 2207/30268; G08B 21/06; G08B 21/02; G08G 1/16
See application file for complete search history.

(56) References Cited

U.S. PATENT DOCUMENTS

| | | | |
|---|---|---|---|
| 5,353,013 | A | 10/1994 | Estrada |
| 6,049,747 | A | 4/2000 | Nakajima et al. |
| 6,304,187 | B1 | 10/2001 | Pirim |
| 6,550,686 | B2 | 4/2003 | Kawai et al. |
| 6,717,518 | B1 | 4/2004 | Pirim et al. |
| 6,915,231 | B2 | 7/2005 | Kim |
| 6,927,694 | B1 | 8/2005 | Smith et al. |
| 7,333,006 | B2 | 2/2008 | Ogawa |
| 7,460,940 | B2 | 12/2008 | Larsson et al. |
| 7,463,157 | B2* | 12/2008 | Victor .................. A61B 5/18 340/576 |
| 7,466,847 | B2 | 12/2008 | Komura |
| 7,821,382 | B2 | 10/2010 | Kameyama |
| 7,848,548 | B1* | 12/2010 | Moon ................... G06K 9/68 382/118 |
| 7,859,652 | B2 | 12/2010 | Uechi |
| 7,860,280 | B2 | 12/2010 | Danowitz |
| 8,050,453 | B2 | 11/2011 | Yang et al. |
| 8,063,786 | B2* | 11/2011 | Manotas, Jr. ............ A61B 5/18 340/576 |
| 8,094,883 | B2 | 1/2012 | Nagai et al. |
| 8,208,027 | B2 | 6/2012 | Shimura |
| 8,356,899 | B2 | 1/2013 | Hirata |
| 8,487,775 | B2 | 7/2013 | Victor et al. |
| 8,538,072 | B2 | 9/2013 | Kelly et al. |
| 8,542,910 | B2 | 9/2013 | Leyvand et al. |
| 8,599,266 | B2 | 12/2013 | Trivedi et al. |
| 8,604,932 | B2 | 12/2013 | Breed et al. |
| 9,041,543 | B2 | 5/2015 | Inada |
| 9,274,597 | B1 | 3/2016 | Karakotsios et al. |
| 9,330,305 | B2 | 5/2016 | Zhao et al. |
| 9,460,601 | B2* | 10/2016 | Mimar ............... G08B 21/0476 |
| 9,721,173 | B2 | 8/2017 | Xu et al. |
| 9,963,153 | B2 | 5/2018 | An et al. |
| 10,474,914 | B2* | 11/2019 | Banno ................ G06T 7/73 |
| 10,503,987 | B2* | 12/2019 | Banno .................. A61B 5/1103 |
| 10,572,746 | B2* | 2/2020 | Banno .................. A61B 5/1101 |
| 2001/0039806 | A1 | 11/2001 | Kawai et al. |
| 2003/0079929 | A1 | 5/2003 | Takagi et al. |
| 2003/0128123 | A1 | 7/2003 | Sumiya et al. |
| 2005/0180605 | A1 | 8/2005 | Toyama |
| 2006/0187305 | A1 | 8/2006 | Trivedi et al. |
| 2006/0235615 | A1 | 10/2006 | Kato et al. |
| 2007/0183651 | A1 | 8/2007 | Comaniciu et al. |
| 2008/0080741 | A1 | 4/2008 | Yokoo et al. |
| 2008/0204239 | A1 | 8/2008 | Marszalek et al. |
| 2008/0267460 | A1 | 10/2008 | Aoki et al. |
| 2009/0191513 | A1 | 7/2009 | Wang et al. |
| 2010/0014711 | A1 | 1/2010 | Camhi et al. |
| 2010/0214105 | A1 | 8/2010 | Manotas, Jr. |
| 2012/0242819 | A1 | 9/2012 | Schamp |
| 2013/0018549 | A1 | 1/2013 | Kobana et al. |
| 2013/0073115 | A1 | 3/2013 | Levin et al. |
| 2013/0147936 | A1 | 6/2013 | Lee et al. |
| 2013/0207805 | A1 | 8/2013 | Inada |
| 2013/0257620 | A1 | 10/2013 | Tsou et al. |
| 2014/0019167 | A1 | 1/2014 | Cheng et al. |
| 2014/0121927 | A1 | 5/2014 | Hanita |
| 2015/0009010 | A1 | 1/2015 | Biemer |
| 2015/0109429 | A1 | 4/2015 | Inoue et al. |
| 2015/0186715 | A1 | 7/2015 | Zhao et al. |
| 2015/0186737 | A1 | 7/2015 | Omi et al. |
| 2015/0266484 | A1 | 9/2015 | Moran et al. |
| 2015/0379362 | A1 | 12/2015 | Calmes et al. |
| 2017/0001648 | A1 | 1/2017 | An et al. |
| 2017/0140232 | A1 | 5/2017 | Banno et al. |
| 2017/0143253 | A1 | 5/2017 | Krenzer et al. |
| 2017/0161575 | A1 | 6/2017 | Banno et al. |
| 2017/0287139 | A1 | 10/2017 | Lee et al. |
| 2019/0034744 | A1 | 1/2019 | Banno et al. |

FOREIGN PATENT DOCUMENTS

| | | |
|---|---|---|
| JP | S60178596 A | 9/1985 |
| JP | H0757172 A | 3/1995 |
| JP | H08-216728 A | 8/1996 |
| JP | H09188163 A | 7/1997 |
| JP | 2000130205 A | 5/2000 |
| JP | 2001250183 A | 9/2001 |
| JP | 2005108033 A | 4/2005 |
| JP | 2005173635 A | 6/2005 |
| JP | 2006318446 A | 11/2006 |
| JP | 2007331652 A | 12/2007 |
| JP | 2008084141 A | 4/2008 |
| JP | 2009176288 A | 8/2009 |
| JP | 2010128649 A | 6/2010 |
| JP | 2011043961 A | 3/2011 |
| JP | 2011164825 A | 8/2011 |
| JP | 2011203869 A | 10/2011 |
| JP | 2014019301 A | 2/2014 |
| JP | 2014515847 A | 7/2014 |
| JP | 2016009256 A | 1/2016 |
| JP | 2016009258 A | 1/2016 |
| JP | 2016085563 A | 5/2016 |

(56) References Cited

FOREIGN PATENT DOCUMENTS

| WO | WO-2013/008300 A1 | 1/2013 |
| WO | WO-2016027411 A1 | 2/2016 |
| WO | WO-2016027412 A1 | 2/2016 |

* cited by examiner

MOTION OF PICKING OBJECT UP

NORMAL DRIVING

SUDDEN ILLNESS ONSET
POSTURE COLLAPSE (WITHIN FA)

NORMAL DRIVING

APPARATUS DETECTING DRIVING INCAPABILITY STATE OF DRIVER

CROSS REFERENCE TO RELATED APPLICATIONS

This application is a continuation application of U.S. Ser. No. 15/321,048 filed on Dec. 21, 2016 which is a U.S. National Phase Application under 35 U.S.C. 371 of International Application No. PCT/JP2015/002864 filed on Jun. 8, 2015 and published in Japanese as WO 2015/198541 A1 on Dec. 30, 2015. These applications are based on and claim the benefit of priority from Japanese Patent Application No. 2014-128387 filed on Jun. 23, 2014 and Japanese Patent Application No. 2015-028001 filed on Feb. 16, 2015. The entire disclosures of all of the above applications are incorporated herein by reference.

TECHNICAL FIELD

The present disclosure relates to apparatus detecting driving incapability state of a driver, which detects that the driver is incapable of driving.

BACKGROUND ART

During driving of a vehicle, the driver may become incapable of driving due to a sudden illness or the like, leading to an accident. For this reason, it has been proposed to detect such driving incapability state of the driver, preventing any accident.

An emergency evacuation device described in Patent Literature 1 recognizes information on sight line, blink, and facial orientation of a driver from a captured image of the driver, as well as measure information on heartbeat, respiration, and brain waves of the driver. The device described in Patent Literature 1 recognizes the driver's states including the degree of deterioration in consciousness, the degree of awakening, and posture of the driver, by using various types of acquired information, and supports emergency evacuation when the driver's states deteriorate.

The inventors of the present application have found that, since the device described in Patent Literature 1 recognized the driver's states by using the various types of information, processing of detecting the driving incapability state of the driver is complicated.

PRIOR ART LITERATURE

Patent Literature

Patent Literature 1: JP 2014-19301 A

SUMMARY OF INVENTION

It is an object of the present disclosure is to provide apparatus detecting driving incapability state of a driver, which can easily detect that the driver is incapable of driving.

According to one aspect of the present disclosure, apparatus detecting driving incapability state of a driver, the apparatus includes: a head detection portion that successively detects a head portion, which is higher than a neck of the driver, based on an image of a driver seat captured by an imaging device mounted in a vehicle; and an out-of-frame state detection portion that detects that the driver is incapable of driving, when the head portion detected by the head detection portion is out of a predetermined scope in the image during travelling of the vehicle.

According to the apparatus detecting driving incapability state of a driver, the apparatus detecting driving incapability state of a driver successively detects a head portion of the driver based on a captured image of a driver seat. When the driver normally drives the vehicle, the head portion of the driver tends to fall within a predetermined scope of the image of the driver seat. On the contrary, when the driver becomes unconscious due to a sudden illness, the head portion of the driver may be out of the predetermined scope. Therefore, the driving incapability state of the driver can be easily detected by detecting that the driver is incapable of driving in the case where the head portion is out of the predetermined scope.

According to a second aspect of the present disclosure, apparatus detecting driving incapability state of a driver, the apparatus includes: a head detection portion that successively detects a head portion, which is higher than a neck of the driver, based on an image of a driver seat captured by an imaging device mounted in a vehicle; a trajectory acquisition portion that acquires a trajectory of the head portion from positions of the head portion detected by the head detection portion; and an out-of-frame state detection portion that detects that the driver is incapable of driving based on the trajectory acquired by the trajectory acquisition portion, during travelling of the vehicle.

According to the apparatus detecting driving incapability state of a driver, the apparatus detecting driving incapability state of the driver successively detects the head portion of the driver based on the image of the driver seat, and acquires a trajectory of the head portion from positions of the detected head portion. When the driver is incapable of driving due to a sudden illness, the head portion of the driver often displaces from a position at driving, and does not return to the position at driving. Therefore, the driving incapability state of the driver can be readily detected based on the trajectory of the head portion of the driver.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Figure 1:
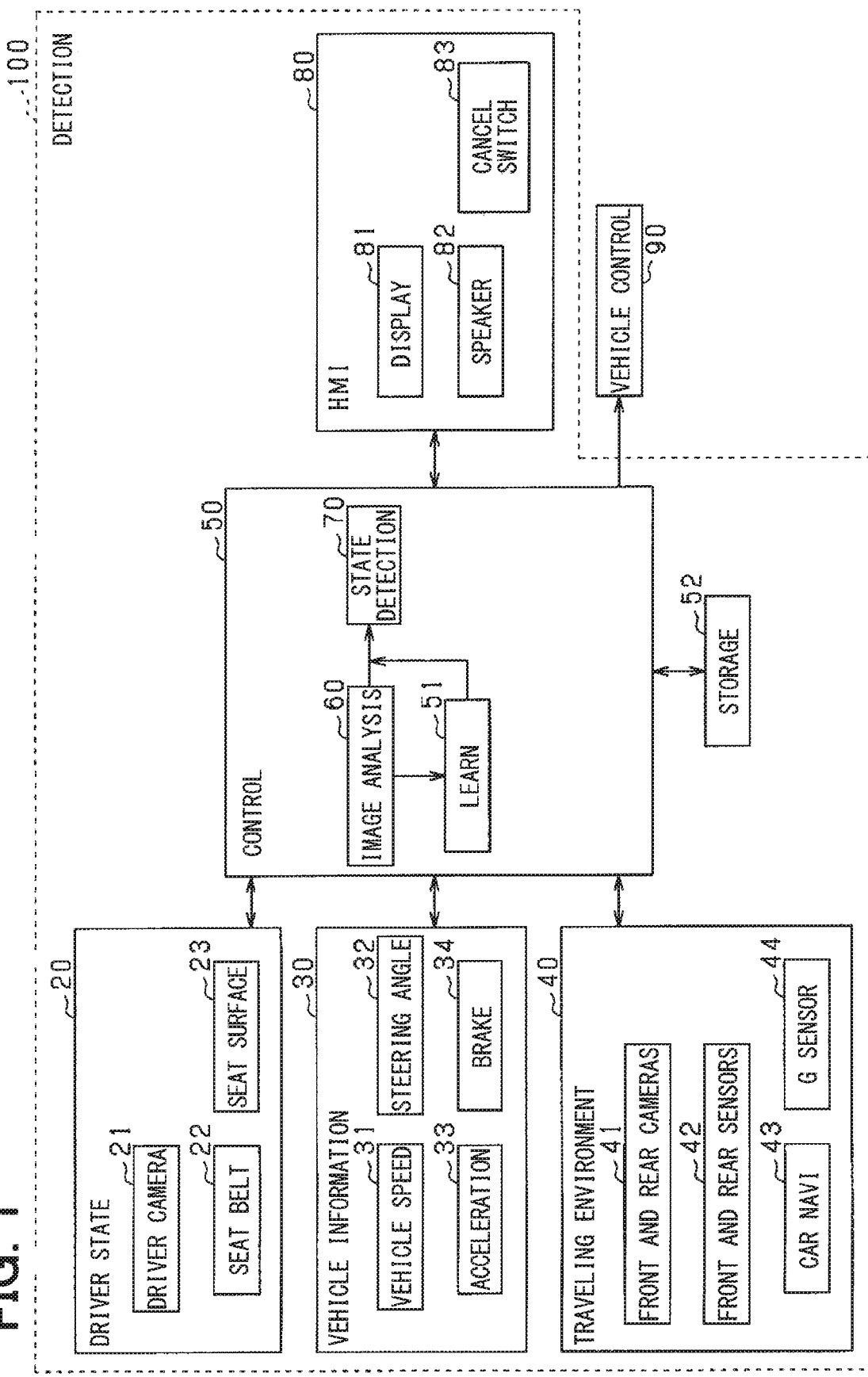
FIG. 1 is a block diagram illustrating configuration of driving incapability state detecting apparatus.

Each embodiment of apparatus detecting driving incapability state of a driver will be described below with reference to the drawings. In the present embodiment, the driving incapability state of the driver includes the state where the driver is unconscious due to a sudden illness and thus, is incapable of driving, and the state where the driver have a sudden illness such as a heart attack, cannot moves his/her body in despite of being conscious, and thus, is incapable of driving. In following embodiments, throughout drawings, identical or equivalent elements are given the same reference numerals, and description thereof is shared.

First Embodiment

Figure 2:
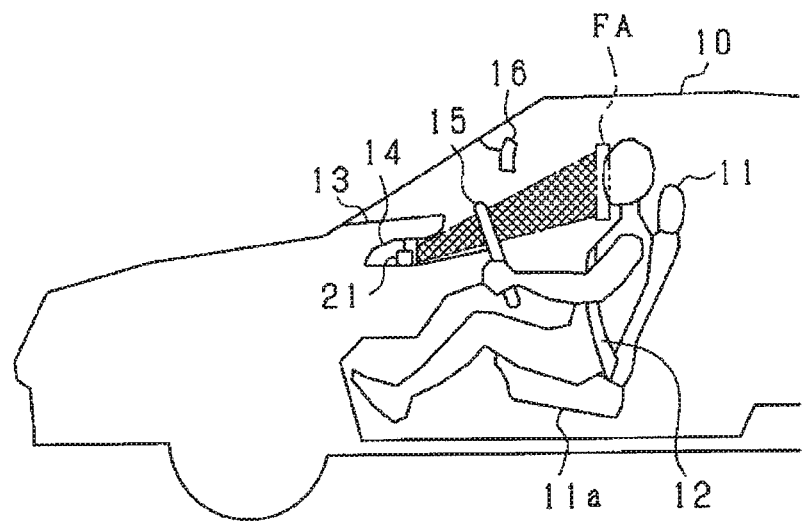
FIG. 2 is a view illustrating the inside of a vehicle equipped with the driving incapability state detection apparatus.
Figure 3:
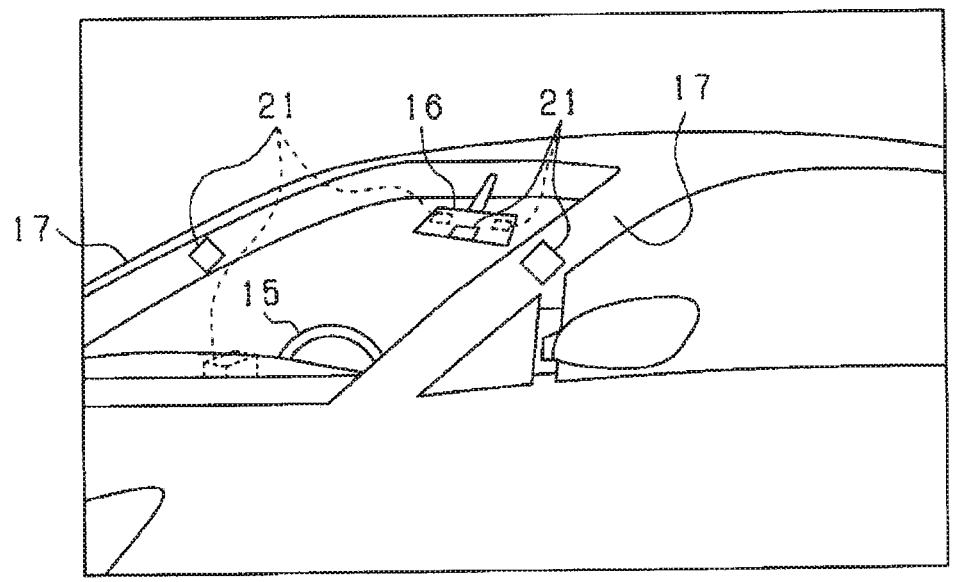
FIG. 3 is a view illustrating a driver seat of the vehicle equipped with the driving incapability state detection apparatus.

Initially, a detection apparatus 100 (apparatus detecting driving incapability state of a driver, or driving incapability state detection apparatus of a driver) in accordance with the present embodiment will be described below with reference to FIGS. 1 to 3. The detection apparatus 100 includes a controller 50, a driver state recognition device 20, a vehicle information recognition device 30, a travelling environment recognition device 40, an HMI (Human Machine Interface) 80, and a storage device 52, and detects the driving incapability state of a driver. Then, when inquiring the driver whether the driver is incapable of driving, and receiving no response, the detection apparatus 100 issues a command to safely stop the vehicle to a vehicle controller 90.

The driver state recognition device 20 includes multiple driver cameras 21, a seat belt sensor 22, and a seat face sensor 23. The driver cameras 21 correspond to an imaging device, the seat belt sensor 22 corresponds to a quantity detection portion, and the seat face sensor 23 corresponds to a sitting pressure detection portion. The driver cameras 21 each are, for example, a CCD camera, and serve to capture an image of the driver seat illuminated from an illumination device such as a near infrared LED. As illustrated in FIGS. 2 and 3, the driver cameras 21 are mounted on a meter panel 14, at a substantially center of a lower end of a rear view mirror 16, and on left and right A pillars 17, to be oriented toward the driver. The driver cameras 21 may be provided on a dashboard 13 (represented by a broken line) and a steering column in place of the meter panel 14. The driver cameras 21 may be provided at a left end or a right end of the rear view mirror 16 (represented by a broken line) in place of the lower end of the rear view mirror 16. The four driver cameras 21 each constitute a driver status monitor, and per second, take a few tens of images of an upper half of the driver who sits on a driver seat 11 from the front side.

The seat belt sensor 22 is a sensor for detecting a drawing amount of a seat belt 12. Specifically, the seat belt sensor 22 is an encoder that detects a motor rotational angle of unwinding and winding of the seat belt 12. The seat face sensor 23 is a sensor that detects pressure distribution of a sitting portion 11a of the driver seat 11.

The vehicle information recognition device 30 includes a vehicle speed sensor 31, a steering sensor 32, an accelerator sensor 33, and a brake sensor 34. The vehicle speed sensor 31 is a sensor that detects the speed of a vehicle 10. The steering sensor 32 is a sensor that detects the steering angle of a steering wheel 15. The accelerator sensor 33 is a sensor that detects the accelerator opening, that is, the manipulated amount of the accelerator pedal. The brake sensor 34 is a sensor that detects the manipulated amount of a brake pedal.

The travelling environment recognition device 40 includes a front/rear camera 41, a front/rear sensor 42, a car navigator 43, and a G sensor 44. The front/rear camera 41 is a camera that captures an image of the front of the vehicle 10, which includes a white line on a road, or a camera that captures an image of the rear and the diagonal rear of the vehicle 10. The front/rear sensor 42 is a sensor such as a ultrasonic sensor, a laser radar, or a millimeter radar, and serves to detect an object located in front of or in the rear of the vehicle 10 to acquire a distance between the vehicle 10 and the object located in front of or in the rear of the vehicle 10. The relative speed with respect to the forward vehicle or the rearward vehicle can be calculated based on the distance between the vehicle 10 and the forward vehicle or the rearward vehicle, which is acquired by the front/rear sensor 42.

The car navigator 43 calculates a present position of the vehicle 10 using a GPS signal received by a GPS receiver and information acquired by various sensors including the G sensor, and calculates a guide path from the present position to a destination. The G sensor 44 is a sensor that is installed on, for example, a seat 11 and detects the three-dimensional acceleration in front of and in the rear of, on the left and right of, and above and below the vehicle 10. The G sensor 44 may be a sensor provided in the car navigator 43, or may be a sensor provided in an Advanced Vehicle Operation System (AVOS) when the vehicle 10 has the AVOS. That is, the G sensor 44 may be shared when installed for another application.

The controller 50 is a microcomputer including a CPU, a ROM, a RAM, and an I/O. The controller 50 acquires various types of information from the driver state recognition device 20, the vehicle information recognition device 30, the travelling environment recognition device 40, the storage device 52, and the HMI 80. The controller 50 is connected to various devices by wired communications such as CAN or wireless communications such as LAN and Bluetooth (registered trademark). The CPU of the controller 50 executes various programs stored in the ROM, thereby performing functions of an image analysis portion 60, a learning portion 51, and a state detection portion 70 to detect the driving incapability state of the driver. Each portion will be described in detail.

The HMI 80 (corresponding to a posture notification portion and an inquiry portion) includes a display 81, a speaker 82, and a cancel switch 83. The display 81 corresponds to a display of the car navigator 43 or a display built in the meter panel 14. The display 81 may be a touch display provided with a liquid crystal panel or an organic EL (electroluminescent) panel. The display 81 notifies the collapse level of the driver's posture, based on the driver's posture detected from the image. Describing in detail, the display 81 displays the driver's posture in five stages. At the posture collapse level 5 having the highest collapse level, the driver cannot keep the driving posture due to a sudden illness, that is, is incapable of driving. The driver can view the status of the posture, which is displayed on the display 81, to check the own driving posture. Thus, when the posture collapse level approaches 5, the driver can correct the driving posture before it is determined that the driver is incapable of driving.

The speaker 82 is a vehicle-mounted speaker shared by the car navigator 43, audio equipment, and the like. When the driving incapability state of the driver is detected, the speaker 82 inquires the driver whether the driver is incapable of driving by sound. The display 81 may display a screen that inquires the driver whether the driver is incapable of driving. The speaker 82 may notify the driver's posture collapse level by sound.

The cancel switch 83 is a switch that stops detection of the driving incapability state. Manipulating the cancel switch 83 once causes detection of the driving incapability state to stop during one trip. When the cancel switch 83 is manipulated during the trip, detection of the driving incapability state is stopped during operation of the cancel switch 83 or a certain period (a few seconds) from start of the manipulation. Thus, when the driver picks up an object, the cancel switch 83 can be manipulated in advance. In this manner, even when the driver's posture collapses, wrong detection that the driver is incapable of driving can be prevented.

Figure 4:
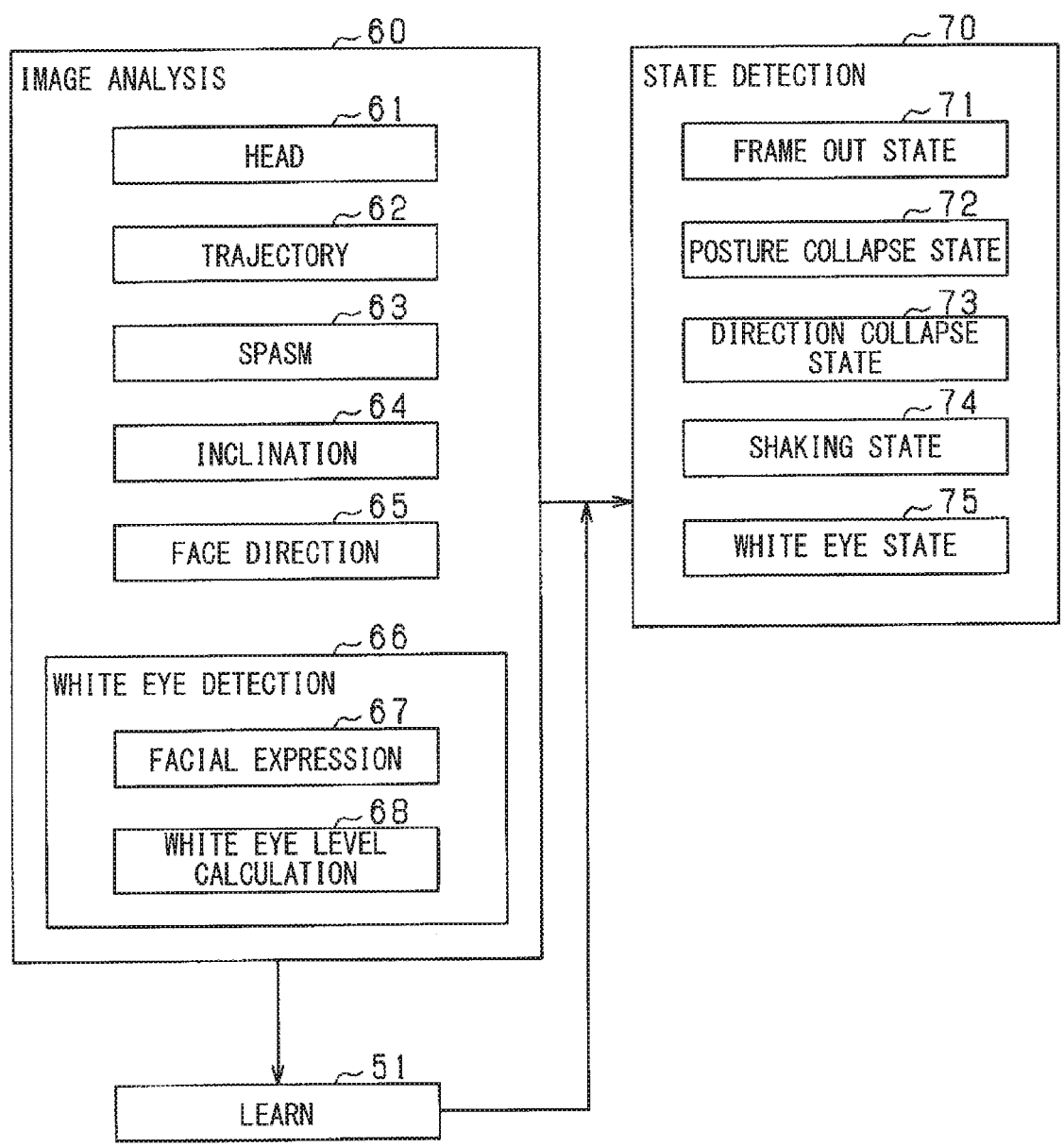
FIG. 4 is a block diagram illustrating functions of a controller.

Various functions of the controller 50 will be described with reference to FIG. 4. The image analysis portion 60 includes a head detection portion 61, a trajectory acquisition portion 62, a spasm detection portion 63, an inclination detection portion 64, a facial orientation detection portion 65, and a white-of-eye detection portion 66.

The head detection portion 61 successively detects the head portion that is higher than a neck of the driver, based on the image of the driver seat, which is captured by each driver camera 21. Describing in detail, each time each driver camera 21 captures an image the driver seat, the head detection portion 61 extracts an edge indicating the outline of the head portion of the driver from the image of the driver seat, and detects a region surrounded with the detected edge as the head portion.

The trajectory acquisition portion 62 acquires a trajectory of the head portion of the driver from positions of the head portion of the driver, which are successively detected by the head detection portion 61. For example, the trajectory acquisition portion 62 uses the center of the head portion of the driver, which is detected in each image, as the position of the head portion, and connects the positions of the head portion in the image to each other, acquiring the trajectory of the head portion.

The spasm detection portion 63 detects a spasm of the driver, that is, involuntary contraction of muscles of a trunk that is lower than the head portion and the neck of the driver. Describing in detail, the spasm detection portion 63 extracts edges of outlines of the head portion and the trunk of the driver in each image. When the edges extracted in successive images vibrate regularly (periodically), the spasm detection portion 63 detects that the driver has a spasm.

The inclination detection portion 64 detects an inclination θ of the head portion with respect to the trunk of the driver based on the image of the driver seat. Describing in detail, the inclination detection portion 64 detects regions surrounded with the edges representing outlines of the head portion and the trunk as the head portion and the trunk, as well as detects central axes of the head portion and the trunk. The inclination detection portion 64 sets the inclination of the central axis of the head portion with respect to the central axis of the trunk, as the inclination θ of the head portion. The orientation of the trunk is determined by matching a predetermined orientation pattern of the trunk with a detected orientation of the trunk, and the central axis of the trunk is detected from the trunk thus oriented. Features such as eye, nose, and mouth of a face included in the head portion are extracted, and the central axis of the head portion is detected based on the three-dimensional arrangement of the features of the face. When the head portion is inclined forward, a distance between the facial features and a front part of the vehicle decreases. When the head portion is bent backward, the distance between the facial features and the front part of the vehicle increases. To detect the central axis of the head portion, the distance of the facial features in the longitudinal direction of the vehicle may be used.

Alternatively, the inclination detection portion 64 detects the seat belt 12 of the driver seat from the image of the driver seat, and detects the inclination θ of the head portion with respect to the trunk from relative position between the seat belt 12 and the head portion. Since the trunk of the driver is restricted with the seat belt 12, the position of the seat belt 12 can be estimated from the position of the trunk.

The facial orientation detection portion 65 detects facial orientation of the driver to the front part of the vehicle 10 based on the image of the driver seat. The facial orientation detection portion 65 detects the inclination of the face with respect to the vertical surface opposed to the front face of the vehicle 10, as facial orientation.

The white-of-eye detection portion 66 includes a facial expression detection portion 67 and a white-of-eye degree calculation portion 68, and detects the state where the driver shows the whites of his/her eyes (the driver rolls his/her eyes). Here, the state where the driver shows the whites of his/her eyes includes the state where the driver completely shows the whites of his/her eyes as illustrated in FIG. 15C and the state where a black-of-eye region is smaller than a predetermined dimension as illustrated in FIG. 15B. That is, the state where the driver shows the whites of his/her eyes refers to the state where the black of the eye becomes unbalanced and smaller than a predetermined scope.

The facial expression detection portion 67 detects the eye outline and the black-of-eye region of the driver from the image of the driver seat. Here, the eye outline of the driver is a boundary line of the eyelid and the eye. The black-of-eye region is, in an inner region of the eye outline, a region having a lower brightness than the white-of-eye, for example, a region of black as well as blue, brown, grey, or the like. The facial expression detection portion 67 detects the opening of the mouth of the driver from the detected edge indicating the mouth outline.

The white-of-eye degree calculation portion 68 calculates the white-of-eye degree of the driver's eye, based on the eye outline and the black-of-eye region, which are detected by the facial expression detection portion 67.

Figure 15A:
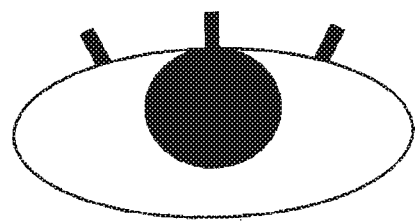
FIG. 15A is a view illustrating a normal state.
Figure 15B:
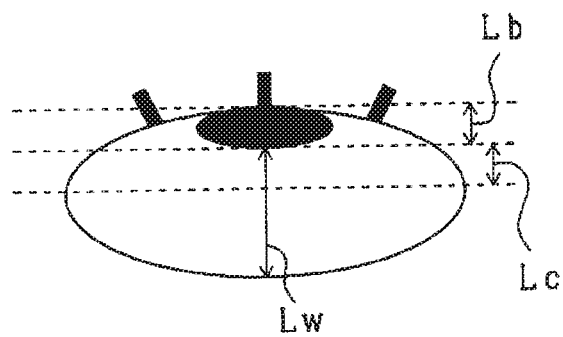
FIG. 15B is a view illustrating a state where the driver shows the white of the eye.
Figure 15C:
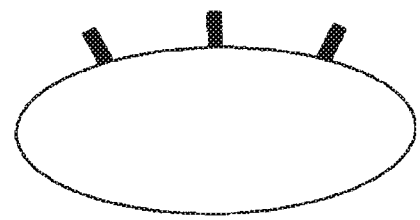
FIG. 15C is a view illustrating a state where the driver completely shows the white of the eye.

Specifically, the white-of-eye degree calculation portion 68 calculates the white-of-eye degree from a ratio of a longitudinal length Lb of the black-of-eye region to a longitudinal length Lw+Lb of a region surrounded with the eye outline (FIG. 15A to FIG. 15C). As the length Lb relative to the length Lw+Lb is smaller, the white-of-eye degree becomes larger. Alternatively, the white-of-eye degree calculation portion 68 calculates the white-of-eye degree from the distance Lb between the top of the eye outline and the bottom of the black-of-eye region. As the distance Lb is smaller, the white-of-eye degree becomes larger. Alternatively, the white-of-eye degree calculation portion 68 calculates the white-of-eye degree based on a ratio of an area of the black-of-eye region to an area of a white-of-eye region, which is acquired by subtracting the area of the black-of-eye region from an area of the entire eye surrounded with the eye outline. As the area of the black-of-eye region with respect to the area of the white-of-eye region is smaller, the white-of-eye degree becomes larger.

Alternatively, the white-of-eye degree calculation portion 68 calculates the white-of-eye degree based on the oblateness of the black-of-eye region. In the white-of-eye state, the black-of-eye region is oriented upward, the oblateness of the black-of-eye region becomes apparently large, and as the oblateness of the black-of-eye region is larger, the white-of-eye degree becomes larger. Alternatively, the white-of-eye degree calculation portion 68 calculates the white-of-eye degree from a distance Lc between a central line of the longitudinal center of the region surrounded with the eye outline and the bottom of the black-of-eye region.

When the driver is not incapable of driving, the learning portion 51 learns the inclination θ of the head portion, which is detected by the inclination detection portion 64. When the driver is not incapable of driving, the learning portion 51 learns the facial orientation detected by the facial orientation detection portion 65. Further, when the driver is not incapable of driving, the learning portion 51 learns amplitude of swing of the head portion detected by the head detection portion 61. That is, the learning portion 51 learns a habit of the driver's driving posture. When multiple drivers use the vehicle 10, the learning portion 51 learns a habit of the driving posture of each driver.

The state detection portion 70 includes an out-of-frame state detection portion 71, a posture collapse state detection portion 72, an orientation collapse state detection portion 73, a swing state detection portion 74, and a white-of-eye state calculation portion 75.

During travelling of the vehicle 10, the out-of-frame state detection portion 71 determines the out-of-frame state. In the case where the head portion is out of frame, the out-of-frame state detection portion 71 detects that the driver is incapable of driving. Describing in detail, the out-of-frame state detection portion 71 detects that the driver is incapable of driving, when the head portion of the driver, which is detected by the head detection portion 61, is out of (or fall without) a scope FA of the image. Here, the scope FA is a predetermined scope (or a predetermined range) in the image taken with the driver cameras 21. During normal driving, the head portion of the driver is never out of the scope FA. The scope FA may be the whole area of the captured image.

Figure 5A:
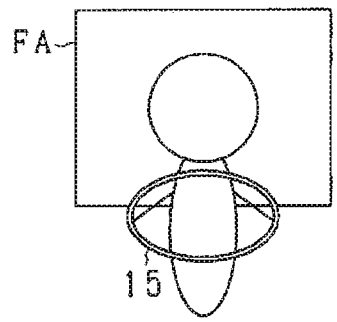
FIG. 5A is a view illustrating a posture during normal driving.
Figure 5B:
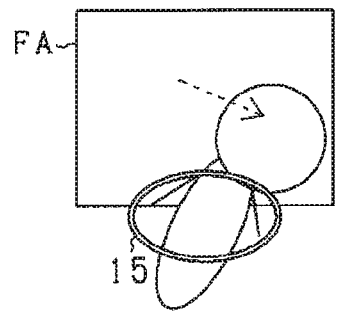
FIG. 5B is a view illustrating a posture when the driver has a sudden illness and posture collapse (within FA) occurs.
Figure 5C:
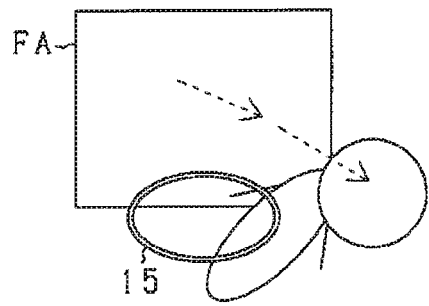
FIG. 5C is a view illustrating a posture in the state where the driver has a sudden illness, and posture collapse (outside FA) occurs.
Figure 6:
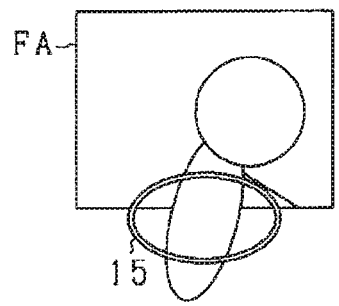
FIG. 6 is a view illustrating a posture in the state where the driver picks up an object.

While the driver normally drives the vehicle 10, as illustrated in FIG. 6, even when the driver picks up an object, the head portion of the driver usually falls within the scope FA of the image. On the contrary, when the driver has a sudden illness and becomes unconscious, as illustrated in FIG. 5A to FIG. 5C, the head portion of the driver may fall outside the scope FA. Thus, on condition that the head portion of the driver falls outside the scope FA of the image, the out-of-frame state detection portion 71 detects that the driver is incapable of driving.

At this time, when the out-of-frame state detection portion 71 considers the trajectory taken by the head portion before the head portion becomes out of the scope FA, which is acquired by the trajectory acquisition portion 62, it may be possible to improve the accuracy of detecting the driving incapability state of the driver. The case where the head portion of the driver cannot be detected in the scope FA due to indistinctness of the image can be distinguished from the case where the head portion of the driver cannot be detected in the scope FA due to the motion of the driver according to the trajectory of the head portion, improving the accuracy of detecting the driving incapability state of the driver.

When the driver temporarily displaces the head portion, or the head portion cannot be detected due to indistinctness of the image, the head portion is often detected in the vicinity of a final position of the trajectory again. Thus, when the head detection portion 61 cannot detect the head portion, the head detection portion 61 searches the vicinity of the final position of the trajectory acquired by the trajectory acquisition portion 62. In this manner, even when the head portion of the driver cannot be detected, the head portion can be efficiently detected again using the trajectory of the head portion.

The posture collapse state detection portion 72 determines whether the driver's posture collapses during travelling of the vehicle 10. When it is determined that the driver's posture collapses, the posture collapse state detection portion 72 detects that the driver is incapable of driving. Describing in detail, when the inclination θ of the head portion, which is detected by the inclination detection portion 64, is larger than a threshold Th1 (a relative inclination threshold), the posture collapse state detection portion 72 detects that the driver is incapable of driving.

Figure 7A:
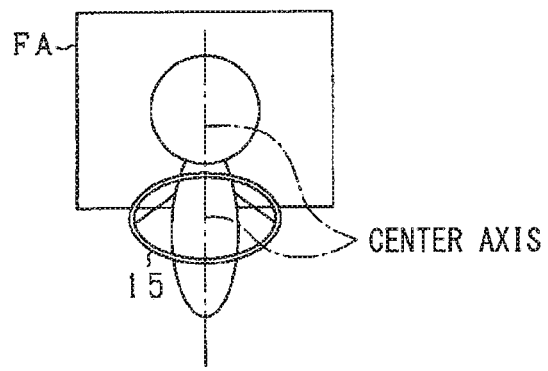
FIG. 7A is a view illustrating a posture during normal driving.
Figure 7B:
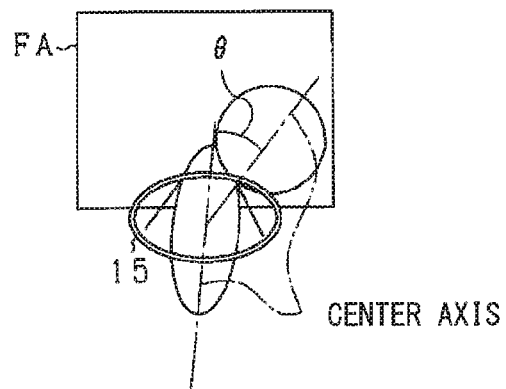
FIG. 7B is a view illustrating a posture in the state where the driver has a sudden illness.

In general, since the trunk part of the driver is restricted by the driver seat 11 and the seat belt 12, even when the driver becomes unconscious, the trunk hardly moves. Since the head portion of the driver is not generally restricted, the driver needs to keep his/her head portion by intent. For this reason, when the driver has a sudden illness and becomes unconscious, the driver cannot keep his/her head portion and as illustrated in FIG. 7A and FIG. 7B, the head portion is often largely inclined toward the trunk in any direction.

Figure 8:
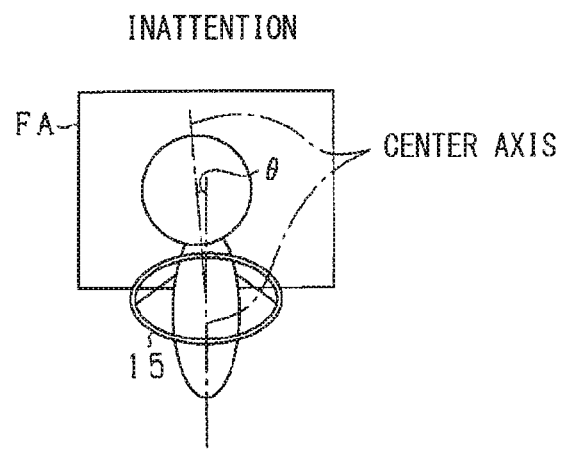
FIG. 8 is a view illustrating a posture in the state where the driver looks aside.
Figure 9:
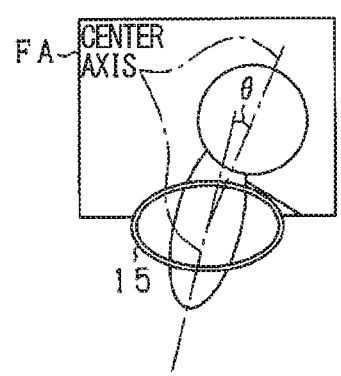
FIG. 9 is a view illustrating a posture in the state where the driver picks up an object.

When the driver looks aside during travelling, the driver generally rotates his/her neck. Thus, as illustrated in FIG. 8, the inclination of the head portion with respect to the trunk tends to be small. When the driver picks up an object located away from the driver seat, the driver generally inclines his/her trunk by intent and thus, as illustrated in FIG. 9, the inclination θ of the head portion with respect to the trunk tends to be small. Thus, on condition that the inclination θ of the head portion is larger than the threshold Th1, the posture collapse state detection portion 72 detects that the driver is incapable of driving. At this time, on condition that the driver turns his/her face away from the front of the vehicle 10, the posture collapse state detection portion 72 detects that the driver is incapable of driving, thereby suppressing wrong detection of the driving incapability state.

The orientation collapse state detection portion 73 determines whether the facial orientation of the driver collapses during travelling of the vehicle 10, and when it is determined that the facial orientation collapses, the orientation collapse state detection portion 73 detects that the driver is incapable of driving. Describing in detail, on condition that the facial orientation with respect to the front of the vehicle 10, which is detected by the facial orientation detection portion 65, is larger than a threshold Th2 (a facial orientation threshold) for a time T2 (an orientation collapse determination time) or more, the orientation collapse state detection portion 73 detects that the driver is incapable of driving.

Figure 10A:
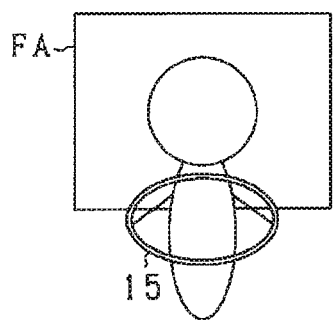
FIG. 10A is a view illustrating facial orientation during normal driving.
Figure 10B:
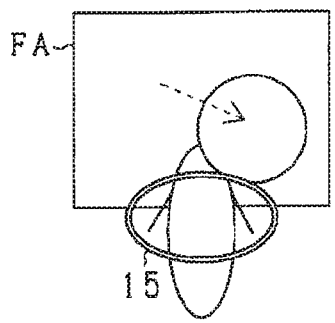
FIG. 10B is a view illustrating facial orientation in the state where the driver has a sudden illness.

In general, when the driver has a sudden illness, the driver cannot keep the facial orientation, and, as illustrated in FIG. 10A and FIG. 10B, the facial orientation with respect to the front of the vehicle 10 remains collapsed. On the contrary, when the driver looks aside during travelling, in general, the driver often immediately returns the facial orientation after that. Thus, in the above-mentioned case, the orientation collapse state detection portion 73 detects the driver is incapable of driving.

Alternatively, on condition that the facial orientation with respect to the front of the vehicle 10, which is detected by the facial orientation detection portion 65, is larger than the threshold Th2, and the driver takes his/her hands off the steering wheel 15, the orientation collapse state detection portion 73 detects that the driver is incapable of driving. Whether the driver leaves the steering wheel 15 may be detected from an image, or using a pressure sensor installed on the steering wheel 15.

Figure 11:
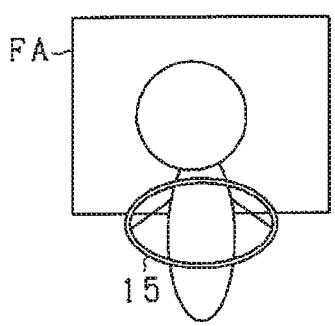
FIG. 11 is a view illustrating a change in facial orientation in the state where the driver looks aside.

In general, when the driver has a sudden illness, the driver cannot keep the facial orientation, and, as illustrated in FIG. 10A and FIG. 10B, the facial orientation with respect to the front of the vehicle 10 collapses, and the driver tends to take his/her hands off the steering wheel 15. On the contrary, when the driver looks aside during travelling, as illustrated in FIG. 11, the driver generally changes the facial orientation while holding the steering wheel 15. When the driver looks aside, the driver may rotate his/her neck to change the facial orientation without inclining the head portion. Thus, in the above-mentioned case, the orientation collapse state detection portion 73 detects the driver is incapable of driving.

On condition that the facial orientation detected by the facial orientation detection portion 65 is larger than the threshold Th2, and the accelerator opening is larger than a predetermined opening, the orientation collapse state detection portion 73 detects that the driver is incapable of driving.

In general, when the driver looks aside during travelling, the driver does not press the accelerator so much. Accordingly, when the facial orientation with respect to the front of the vehicle 10 is larger than the threshold Th2, and the accelerator opening is larger than the predetermined opening, the facial orientation is more likely to collapse due to a sudden illness, not due to looking-aside. Thus, in the above-mentioned case, the orientation collapse state detection portion 73 detects the driver is incapable of driving.

On condition that the facial orientation detected by the facial orientation detection portion 65 is larger than the threshold Th2, and the accelerator and the brake are not operated for a time T3 (an operation determination time) or more, the orientation collapse state detection portion 73 detects that the driver is incapable of driving.

In general, when the driver has a sudden illness, the facial orientation with respect to the front of the vehicle 10 collapses, and the accelerator and the brake are not operated for a time that is longer than the time T3. On the contrary, when the driver looks aside during travelling, in general, the driver tends to change the facial orientation, and operate the accelerator and the brake within the time T3. Thus, in the above-mentioned case, the orientation collapse state detection portion 73 detects the driver is incapable of driving.

The swing state detection portion 74 determines the swing state of the head portion of the driver due to an external force, during travelling of the vehicle 10, and on condition that the head portion unusually swings, the swing state detection portion 74 detects that the driver is incapable of driving. Describing in detail, in a period in which a time T5 (a swing determination time) elapses after an application of an external force to the vehicle 10, on condition that the amplitude of swing of the head portion detected by the head detection portion 61 is smaller than an amplitude Am1 (a first amplitude) or larger than an amplitude Am2 (a second amplitude), the swing state detection portion 74 detects that the driver is incapable of driving. The amplitude Am2 is larger than the amplitude Am1.

Figure 12:
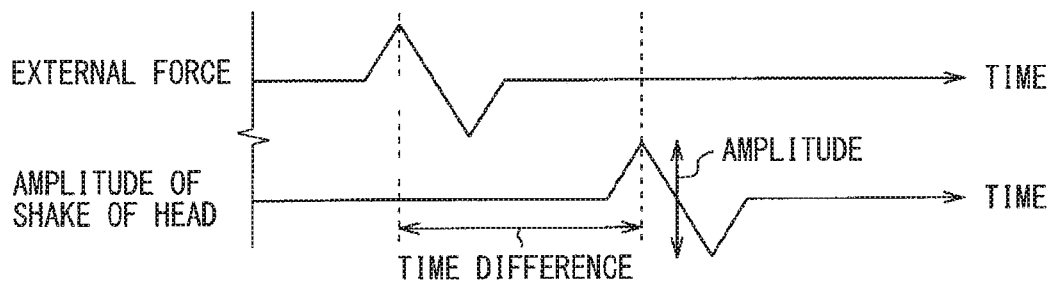
FIG. 12 is a diagram illustrating swing of a head portion, which is caused by an external force.
Figure 13:
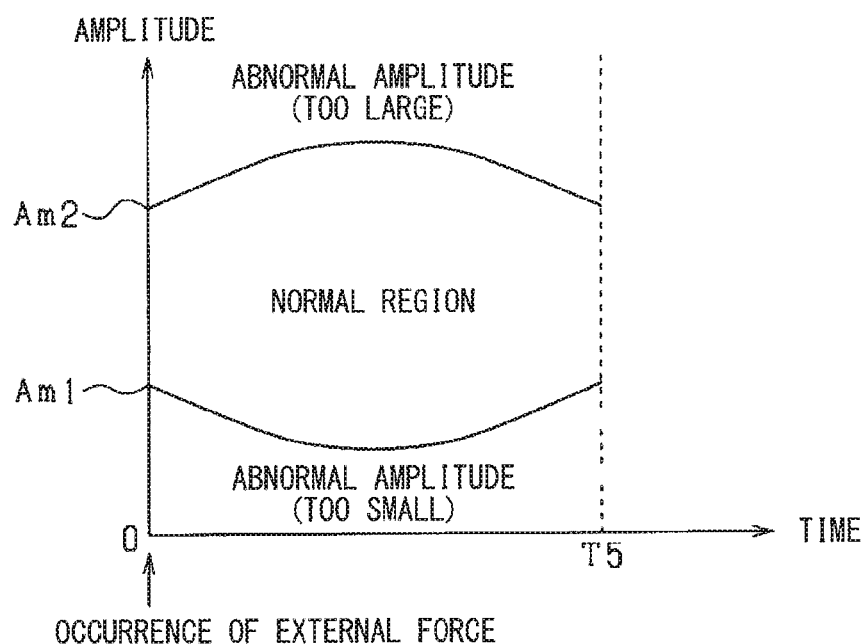
FIG. 13 is a diagram illustrating an amplitude scope of swing of the head portion, which is determined as a driving incapability state.

As illustrated in FIG. 12, when an external force is applied to the vehicle 10, after a predetermined time, vibration is transmitted to the driver. Normally, in the case where the driver is conscious, when an external force (in detail, vertical external force) is applied to the vehicle 10, as illustrated in FIG. 13, the head portion of the driver swings with an amplitude in the scope from the amplitude Am1 to the amplitude Am2. On the contrary, when the driver has a sudden illness and becomes rigid, the amplitude of swing of the head portion is smaller than usual. When the driver has a sudden illness and becomes relaxed, the amplitude of swing of the head portion is larger than usual. Thus, in such case, the swing state detection portion 74 detects that driving incapability state of the driver.

The time T5 is a time taken until the driver becomes irrelevant to the external force after application of an external force to the vehicle 10. The amplitude Am1 and the amplitude Am2 are time functions, and FIG. 13 illustrates one example. In determination of the swing state, in a simple way, a minimum value of the amplitude Am1 and a maximum value of the amplitude Am2 in a period in which the time T5 elapses after application of an external force, are set as thresholds.

The white-of-eye state calculation portion 75 determines the white-of-eye during travelling of the vehicle 10, and when the white-of-eye detection portion 66 detects the white-of-eye state, the white-of-eye state calculation portion 75 detects that the driver is incapable of driving. Describing in detail, on condition that the white-of-eye degree calculated by the white-of-eye degree calculation portion 68 is larger than a threshold Th3 (a white-of-eye threshold), the white-of-eye state calculation portion 75 detects that the driver is incapable of driving.

Figure 14A:
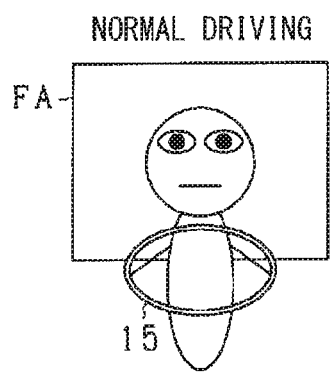
FIG. 14A is a view illustrating a facial expression during normal driving.
Figure 14B:
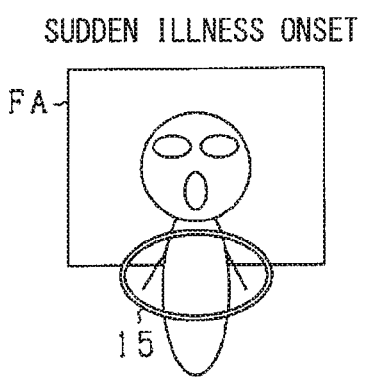
FIG. 14B is a view illustrating a facial expression in the state where the driver has a sudden illness.

Normally, when the driver is capable of driving, the driver never shows the whites of the eye. On the contrary, when the driver has a sudden illness, as illustrated in FIG. 14A and FIG. 14B, the driver may show the whites of the eye. Thus, on condition that the white-of-eye state is detected, the white-of-eye state calculation portion 75 detects that the driver is incapable of driving.

The storage device 52 (a storage portion) stores a threshold and a determination value, which are used by a state detection portion. Further, the storage device 52 stores the inclination θ of the head portion, the facial orientation, and the amplitude of swing of the head portion, which are learned by the learning portion 51. The storage device 52 registers personal information including a medical history and age of the driver. When there are multiple drivers, personal information of each driver is registered. The storage device 52 registers the driver's posture that is not determined as the driving incapability state and the driver's posture that is determined as the driving incapability state. The driver's posture that is not determined as the driving incapability state includes normal driving posture and frequently-taken postures. The driver's posture that is determined as the driving incapability state includes posture taken by the driver having a chronic illness at spasm.

The driver previously images a posture to be registered in the driver seat with the driver cameras 21, and registers the posture in the storage device 52.

A processing procedure of detecting the driving incapability state of the driver will be described with reference to flowcharts of FIG. 16A and FIG. 16B. This processing procedure is executed by the controller 50.

It is determined whether the vehicle speed of the vehicle 10 is V or less (S10). V may be 0 km/h (halt), or sufficiently low speed determined to be a halt (for example, 1 km/h). When the vehicle speed is V or less (S10: YES), the determination in S10 is repeatedly made until the vehicle speed is determined to be higher than V. When the vehicle speed is higher than V (S10: NO), it is determined that the vehicle is travelling, and processing of detecting the driving incapability state of the driver starts to determine the out-of-frame state.

Here, in the determination in S10, it may be determined whether the driver is driving. When the driver is driving, the determination in S10 may be repeated, and when the vehicle is travelling and the driver is not driving, the processing of detecting the driving incapability state of the driver may be started. For example, it is determined whether the vehicle speed of the vehicle 10 is V2 (for example, 50 km/h) or more, the steering angle detected by the steering sensor 32 is a predetermined angle or more, or the steering angular speed is a predetermined angular speed or more. V2 is a value indicating that the driver is operating the accelerator pedal, and the predetermined angle and the predetermined angular speed are angles indicating that the driver is operating the steering wheel. When at least one of the three conditions is satisfied, it is determined that the driver is driving, and the processing of detecting the driving incapability state of the driver is not started.

In determination of the out-of-frame state, first, the head portion and the trunk of the driver are detected from the image of the driver seat (S11).

At this time, facial features included in the head portion of the driver are detected to authenticate the driver. The driver may be previously authenticated by communication with a mobile terminal such as a smart phone, or by communication with a key of the vehicle 10, in which personal information is registered.

Next, it is determined whether the position of the head portion can be detected (S12). When the position of the head portion is not detected (S12: NO), trajectory information of the head portion is acquired from positions of the head portion, which are recorded in below-mentioned processing in S19, and it is determined whether the trajectory information indicates the out-of-frame state (S13). That is, it is determined whether a reason for non-detection of the position of the head portion is that the head portion falls outside an imaging scope, or that the image is indistinct.

When the trajectory information of the head portion does not indicate the out-of-frame state (S13: NO), it is determined that the head portion cannot be detected due to indistinctness of the image, and the procedure returns to processing in S10. On the contrary, when the trajectory information of the head portion indicates the out-of-frame state (S13: YES), it is determined that the head portion falls outside the imaging scope. In this case, to confirm that the head portion falls outside the imaging scope, information from the seat belt sensor 22 and the seat face sensor 23 is auxiliarily used (S14).

Next, it is determined whether the out-of-frame state continues for a time T0 (an out-of-frame determination time) or more (S15). Describing in detail, it is determined, for the time T0 or more, whether the position of the head portion falls outside the scope FA, and also the drawing amount of the seat belt 12 is larger than the drawing amount detected at attachment of the seat belt 12 by a first drawing amount or more, and also a high-pressure section in the pressure distribution of the sitting portion 11a leans to an end of the sitting portion 11a. Then, on condition that the three conditions are satisfied, it is determined that the driver is out of frame for the time T0 or more. Here, a following condition may be set: the drawing amount per amount detection time, which is detected by the seat belt sensor 22, that is, the drawing speed of the seat belt 12 may be larger than a second drawing amount.

Information from the seat belt sensor 22 and the seat face sensor 23 may not be used. That is, processing in S14 may not be executed, and in processing in S15, it may be only determined whether the position of the head portion continuously falls outside the scope FA for the time T0 or more.

Here, the time T0 is set based on personal information registered in the storage device 52. For example, as age is higher, the time T0 is made smaller. A shorter time T0 is set to a person having a certain medical history than a person having no certain medical history. Further, the time T0 is changed according to the state of the driver and travelling environment. In the state where the driver shows a sign of the driving incapability state, in the state where the probability that the driver is incapable of driving is high, or in travelling environment in which collision is likely to occur when the driver is incapable of driving, the time T0 is decreased to facilitate detection of the driving incapability state of the driver.

Specifically, when the position of the head portion, which is recorded in processing in S19, vibrates with amplitude that is larger than a predetermined amplitude, that is, when the head portion unsteadily swings, the probability of the driving incapability state is high and thus, the time T0 is decreased. As the moving speed of the head portion is faster, the posture is more likely to collapse due to sudden illness than due to picking-up of an object. Thus, in the acquired trajectory information of the head portion, as the moving speed of the head portion is higher, the time T0 is decreased. In the case of posture collapse due to sudden illness, as the head portion approaches the end of the scope FA, the moving speed of the head portion often becomes faster. Thus, when the moving speed of the head portion becomes faster as the recorded position of the head portion approaches the end of the scope FA, the posture is more likely to collapse due to sudden illness than due to picking-up of an object. Therefore, when the moving speed of the head portion becomes faster as the recorded position of the head portion approaches the end of the scope FA, the time T0 is decreased. When a spasm is detected, the probability of the driving incapability state is high and thus, the time T0 is decreased.

To avoid collision, suitable vehicle control needs to start earlier as the vehicle speed is faster. Thus, the time T0 is decreased as the vehicle speed of the vehicle 10 is faster. To avoid collision, suitable vehicle control needs to start earlier as TTC (Time To Collision) obtained by dividing a distance between a preceding vehicle and the own vehicle by their relative speed is shorter. Thus, the time T0 is decreased as the TTC is shorter. When drive assistance control such as ACC (Adaptive Cruise Control) and LKA (Lane Keep Assist) is performed in the vehicle 10, the posture of the driver may collapse for a long time. Thus, the time T0 is increased. Further, the time T0 may be decreased in day of week or time frame when a sudden illness such as heart attack occurs statically frequently.

When the non-out-of-frame state continues for the time T0 or more (S15: NO), the procedure proceeds to processing in S21. When the out-of-frame state continues for the time T0 or more (S15: YES), it is determined that the driver is incapable of driving, and the driver is inquired about the driving incapability state. Describing in detail, detection of the driving incapability state is informed by means of sound from the speaker 82, display on the display 81, flashing of an indicator (not illustrated), or the like, and it is determined whether the driver makes a response within a predetermined time (S16).

When, within the predetermined time, any of a contact of the driver onto a touch display, voice of the driver, an operation of the steering wheel 15, the brake, or so on of the vehicle 10, and an operation of a certain switch is detected, it is determined that the driver makes a response (S16: NO). When none of them is detected, it is determined that the driver makes no response (S16: YES).

When it is determined that the driver makes a response, recognition that the driver is capable of driving is notified by sound from the speaker 82 or display on the display 81 (S17). On the contrary, when it is determined that the driver makes no response, the vehicle controller 90 is instructed to suitably brake and steer the vehicle to stop the vehicle. To notify the circumstance to surrounding vehicles, the vehicle controller 90 is instructed to turn on a headlight and sound a horn (S18). Further, the circumstance is also notified to other passengers of the vehicle 10.

Next, when it is determined that the position of the head portion can be detected in the processing in S12 (S12: YES), the position of the head portion and the trunk are recorded (S19). Trajectory information on the head portion can be acquired from positions of the head portion, which are recorded in each image.

Next, it is determined whether the position of the head portion falls outside the preset scope FA (S20). When the position of the head portion falls within the imaging scope, but falls outside the scope FA (S20: YES), the procedure proceeds to processing in S15 to determine the out-of-frame state.

Subsequently, it is determined whether the posture of the driver is the posture determined as the driving incapability state, which is registered in the storage device 52, based on the relative position of the head portion to the trunk (S21).

When the driver's posture is the posture that is determined as the driving incapability state (S21: YES), it is determined that the driver is incapable of driving, and the procedure proceeds to processing in S16.

Figure 17:
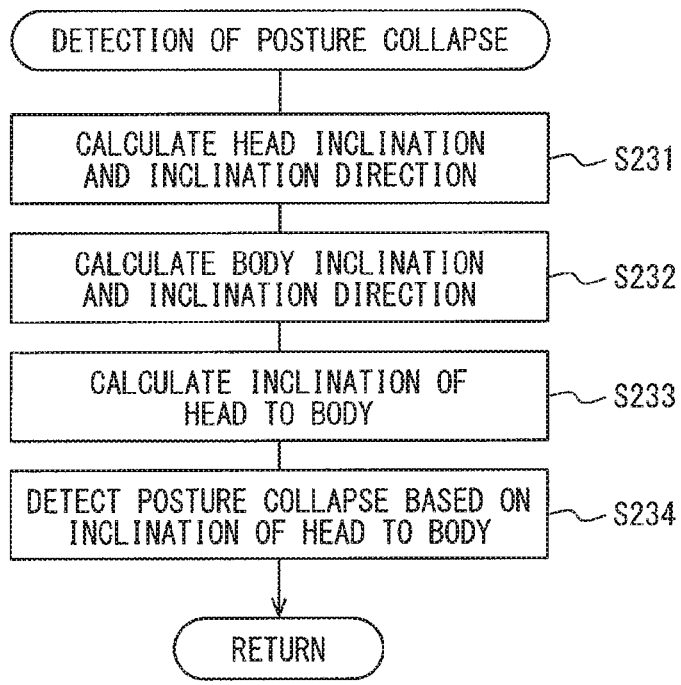
FIG. 17 is a diagram illustrating a sub-routine illustrating a processing procedure of detecting posture collapse.

When the driver's posture is not the posture that is determined as the driving incapability state (S21: NO), it is determined whether the driver's posture is the position that is not determined as the driving incapability state, which is registered in the storage device 52 (S22). When the driver's posture is the posture that is not determined as the driving incapability state (S22: YES), the procedure returns to the processing in S10. When the driver's posture is different from the posture that is not determined as the driving incapability state (S22: NO), posture collapse is determined It is determined whether posture collapse is detected (S23). Describing in detail, posture collapse is detected according to processing of a sub-routine in FIG. 17. First, the inclination of the head portion and the inclination direction of the head portion are calculated (S231). Subsequently, the inclination of the trunk and the inclination direction of the trunk are calculated (S232). Then, an angle that the calculated inclination of the trunk forms with the calculated inclination of the head portion, that is, the inclination $\theta$ of the head portion with respect to the trunk is calculated (S233). The calculated inclination $\theta$ of the head portion is learned when the driving incapability state of the driver is not detected. Then, on condition that the calculated inclination $\theta$ of the head portion is larger than the threshold Th1 (relative inclination threshold), posture collapse is detected (S234). Next, when the posture collapse is not detected (S23: NO), the procedure proceeds to determination of facial orientation collapse in S25.

When the posture collapse is detected (S23: YES), it is determined whether, for the time T1 or more, the inclination $\theta$ of the head portion is continuously larger than the threshold Th1 and the face is not continuously oriented to the front of the vehicle 10 (S24).

Here, a following simple condition may be set: for the time T1 or more, the inclination $\theta$ of the head portion is continuously larger than the threshold Th1, or the face is not continuously oriented to the front of the vehicle 10. Here, a following condition may be set: for the time T1 or more, the calculated inclination direction of the head portion and inclination direction of the trunk do no continuously vary, that is, the position of the head portion and the position of the trunk continuously fall within a scope UA (an unmoving determination area). In the scope UA, the head portion and the trunk are deemed as being stationary. Alternatively, a following condition may be set: the calculated inclination $\theta$ of the head portion is larger than learned inclination of the head portion by a determination value D1 (an inclination determination value) or more. Alternatively, a following condition may be set: the steering wheel 15 is not operated for the time T3 (an operation determination time) or more.

Here, like the time T0, the time T1 is set based on personal information registered in the storage device 52, and is changed according to vehicle speed, TTC, and presence/absence of execution of drive assistance control. The threshold Th1 decreases when a spasm is detected. Further, like the time T0, the time T1 may be decreased in day of week or time frame when a sudden illness such as heart attack occurs statically frequently.

When the inclination $\theta$ of the head portion is larger than the threshold Th1, and the face is not oriented to the front of the vehicle 10 for the time T1 or more (S24: YES), it is determined that the driver is incapable of driving, and the procedure proceeds to inquiry processing in S16. When, for the time T1 or more, the inclination θ of the head portion is not continuously larger than the threshold Th1, or the face is continuously oriented to the front of the vehicle (S24: NO), facial orientation collapse is determined next.

It is determined whether collapse of the facial orientation is detected (S25). Describing in detail, driver's facial orientation toward the front of the vehicle is detected. Then, when the detected facial orientation is larger than the threshold Th2 (a facial orientation threshold), collapse of the facial orientation is detected. When the facial orientation collapse is not detected (S25: NO), the procedure proceeds to swing state determination in S28. The detected facial orientation is learned when the driving incapability state of the driver is not detected.

When the facial orientation collapse is detected (S25: YES), it is determined whether the facial orientation is continuously larger than the threshold Th2 for the time T2 (an orientation collapse determination time) or more (S26).

Here, like the time T0, the time T2 is set based on personal information registered in the storage device 52, and is changed according to vehicle speed, TTC, and presence/absence of execution of drive assistance control. Further, like the time T0, the time T2 may be decreased in day of week or time frame when a sudden illness such as heart attack occurs statically frequently. When a spasm is detected, the threshold Th2 is decreased.

When the facial orientation is continuously larger than the threshold Th2 for the time T2 or more (S26: YES), it is determined that the driver is incapable of driving, and the procedure proceeds to the inquiry processing in S16.

When the facial orientation is not continuously larger than the threshold Th2 for the time T2 or more (S26: NO), it is determined whether, for the time T3 or more, the driver takes his/her hands off the steering wheel 15, the accelerator opening is larger than a predetermined opening, or the accelerator and the brake are not operated (S27). When at least one of three conditions in the processing in S27 is satisfied (S27: YES), it is determined that the driver is incapable of driving, and the procedure proceeds to the inquiry processing in S16. When none of the three conditions in the processing in S27 is satisfied (S27: NO), the swing state is determined.

Here, in the determination processing in S26, the condition that at least one of the three conditions in the processing in S27 is satisfied may be set. In the determination processing in S26 and S27, a following condition may be set: the detected facial orientation is larger than the learned facial orientation by the determination value D1 (an inclination determination value) or more. In general, since the driver is not put into the driving incapability state with the driver's hands being higher than the driver's neck, the condition that the driver's hands are located lower than the driver's neck may be set.

Next, in the swing state determination, it is determined whether abnormal unsteadiness of the head portion is detected at application of an external force (S28). Describing in detail, it is determined whether, until the time T5 (a swing determination time) elapses after application of an external force to the vehicle 10, the amplitude of swing of the head portion is smaller than the amplitude Am1 (a first amplitude) or is larger than the amplitude Am2 (a second amplitude).

Here, a following condition may be set: the head portion vibrates with an abnormal amplitude while the time T5 elapses after application of an external force to the vehicle 10, and after an elapse of the time T5, the position of the head portion falls within the range UA. That is, a following condition may be set: the head portion vibrates according to an external force, and after the effect of the external force is lost, the position of head portion does not change. Alternatively, a following condition may be set: when the driving incapability state of the driver is not detected, an amplitude of swing of the head portion is learned, and the detected amplitude of swing of the head portion is larger than the learned amplitude of swing of the head portion by the determination value D2 (an amplitude determination value) or more. A condition that the steering wheel 15 is not continuously operated for the time T3 or more may be set.

When abnormal unsteadiness of the head portion is detected at application of an external force (S28: YES), it is determined that the driver is incapable of driving, and the procedure proceeds to the inquiry processing in S16. When abnormal unsteadiness of the head portion is not detected at application of an external force (S28: NO), the white-of-eye state is determined.

It is determined whether the white-of-eye state is detected (S29). Describing in detail, when the calculated white-of-eye degree is larger than the threshold Th3 (a white-of-eye threshold), it is determined that the white-of-eye state is detected. Here, the white-of-eye degree of each of both driver's eyes is calculated, and when the white-of-eye degrees of both eyes each are larger than the threshold Th3, it is determined that the white-of-eye state is detected. However, when only one eye is detected, or the white-of-eye state is detected in a simple way, detection of the white-of-eye state may be determined based on the white-of-eye degree of one eye.

When it is determined that the white-of-eye state is not detected (S29: NO), in all of out-of-frame determination, posture collapse determination, facial orientation collapse determination, swing state determination, and white-of-eye state determination, the driving incapability state of the driver is not detected, and the procedure proceeds to the processing in S10.

When it is determined that the white-of-eye state is detected (S29: YES), it is determined whether the white-of-eye degree is larger than the threshold Th3 for the time T4 (a white-of-eye determination time) or more (S30). Here, a condition that the steering wheel 15 is not continuously operated for the time T3 or more may be set.

Here, like the time T0, the time T4 is set based on personal information registered in the storage device 52, and is changed according to vehicle speed and TTC. When a spasm is detected, the threshold Th3 is decreased. Further, like the time T0, the time T4 may be decreased in day of week or time frame when a sudden illness such as heart attack occurs statically frequently.

When the white-of-eye degree is not continuously larger than the threshold Th3 for the time T4 or more (S30: NO), the procedure proceeds to the processing in S10. When the white-of-eye degree is continuously larger than the threshold Th3 for the time T4 or more (S30: YES), the driving incapability state of the driver is detected, and the procedure proceeds to the inquiry processing in S16. Here, this processing is finished.

Figure 18:
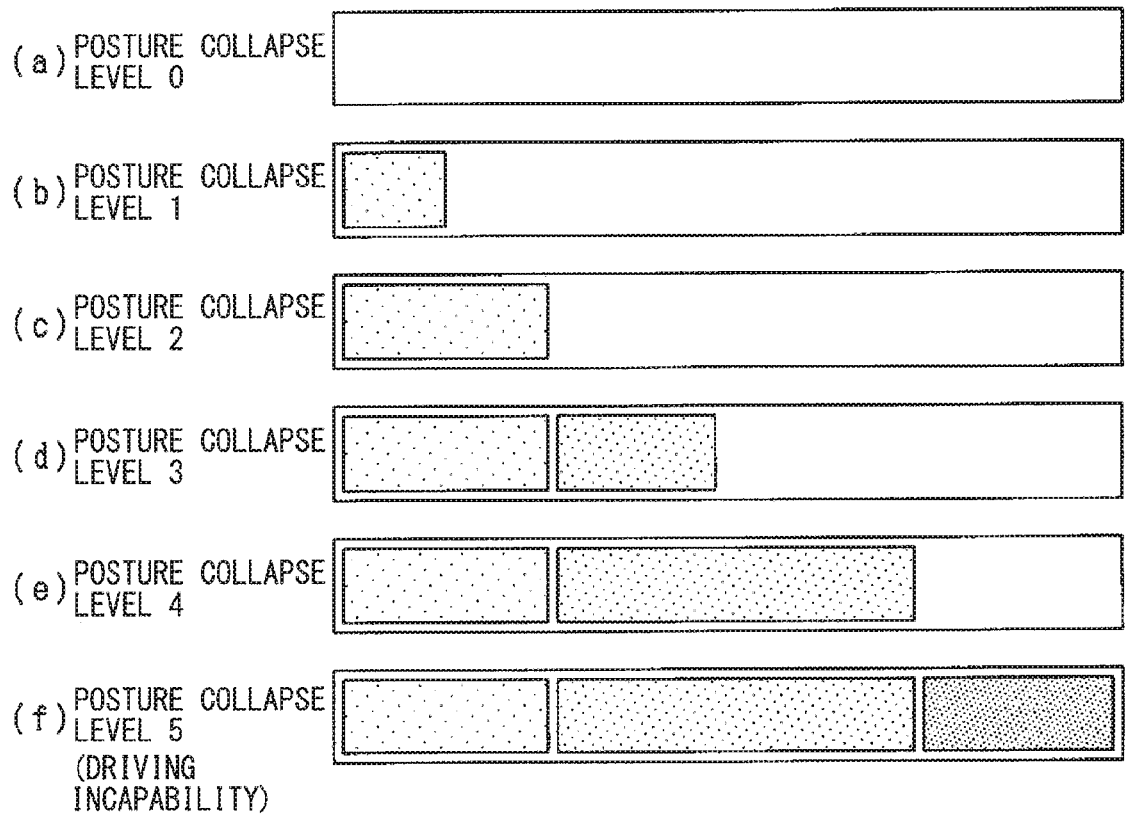
FIG. 18 is a view illustrating a mode notifying posture collapse level to the driver.

As illustrated in FIG. 18, the driver's posture collapse level is displayed on the display 81, based on the detected inclination θ of the head portion with respect to the trunk, the detected facial orientation, and the detected position of the head portion. As the detected inclination θ of the head portion is larger, the posture collapse level is set to be higher. As the detected facial orientation is larger, the posture collapse level is made higher. As the detected position of the head portion is away from a standard position during driving, the posture collapse level is set to be higher. The standard position during driving is the position of the head at start of the vehicle 10, or an average position of the head portion at the time when the driving incapability state of the driver is not detected.

According to the present embodiment, the following effects can be obtained.

By detecting that the driver is incapable of driving on condition that the head portion of the driver falls outside the scope FA, the driving incapability state of the driver can be readily detected. Further, considering the trajectory acquired until the head portion falls outside the scope FA, the accuracy of detecting the driving incapability state of the driver can be improved.

When the driver picks up an object located away from the driver seat, even if the head portion temporarily falls outside the scope FA, the head portion tends to return to the scope FA. Thus, by setting the condition that the head portion of the driver falls outside the scope FA for the time T0 or more, wrong detection of the driving incapability state of the driver can be suppressed.

Given that the scope FA is the entire image, since the driving incapability state of the driver is detected when the head portion of the driver is not present in the image, detection processing can be further simplified.

When the driver's posture collapses due to a sudden illness, it is estimated that the drawing amount of the seat belt 12 at this time is larger than the drawing amount at attachment of the seat belt by a first drawing amount or more. Even if the head portion of the driver cannot be detected, when the drawing amount of the seat belt 12 is larger than the drawing amount at attachment by the first drawing amount or more, it finds out that the head portion of the driver falls outside the imaging scope. Thus, by setting the condition that the drawing amount of the seat belt 12 is larger than the drawing amount at attachment by the first drawing amount or more, the driving incapability state of the driver can be detected with high accuracy.

The driver's posture collapses more rapidly when the driver has a sudden illness than when the driver picks up an object. For this reason, the seat belt 12 is drawn out more rapidly when the driver has a sudden illness than when the driver picks up an object. Thus, by setting a condition that the drawing amount of the seat belt 12 per amount detection time is larger than a second drawing amount, wrong detection of the driving incapability state of the driver can be suppressed.

When the driver's posture collapses due to a sudden illness, it is estimated that a high-pressure section in pressure distribution of the sitting portion 11a of the driver seat leans to an end of the sitting portion 11a. Even if the head portion of the driver cannot be detected, when the high-pressure section in pressure distribution of the sitting portion 11a of the driver seat leans to the end of the sitting portion 11a, it finds out that the head portion of the driver falls outside the imaging scope. Thus, by setting that the high-pressure section in pressure distribution of the sitting portion 11a of the driver seat leans to the end of the sitting portion 11a, the driving incapability state of the driver can be detected with high accuracy.

By decreasing the time T0 when the head portion vibrates with amplitude that is larger than a predetermined amplitude, that is, when the head portion unsteadily swings, time required to determine the driving incapability state of the driver can be reduced. Accordingly, vehicle control in the driving incapability state of the driver can be started earlier.

By decreasing the time T0 as the moving speed of the head portion is higher, time required to determine the driving incapability state of the driver can be reduced.

By reducing time required to determine the driving incapability state when the moving speed of the head portion is higher as the head portion approaches the end of the scope FA, the time required to determine the driving incapability state of the driver can be reduced.

When the inclination θ of the head portion with respect to the trunk is larger than the threshold Th1, the posture collapse is more likely to occur due to sudden illness than due to picking-up of an object. Therefore, by detecting that the driver is incapable of driving on condition that the inclination θ of the head portion with respect to the trunk is larger than the threshold Th1, the driving incapability state of the driver can be detected with high accuracy.

During travelling, when the driver largely inclines the head portion toward the trunk by intent, it is estimated that the driver continues to turn his/her face toward the front of the vehicle 10 for safety reason. Thus, by setting that the face is not oriented toward the front of the vehicle 10, wrong detection of the driving incapability state of the driver can be suppressed.

During travelling, when the driver largely inclines the head portion toward the trunk by intent, it is estimated that the driver rapidly returns the head portion to the original position for safety reason. Thus, by setting a condition that the head portion largely inclines with respect to the trunk for the time T1 or more, wrong detection of the driving incapability state of the driver can be suppressed.

By setting a condition that the positions of the head portion and the trunk are unchanged while the head portion is largely inclined with respect to the trunk for the time T1 or more, wrong detection of the driving incapability state of the driver can be suppressed.

By setting a condition that the detected inclination θ of the head portion is larger than learned inclination of the head portion by the determination value D1 or more, even when the driver has a habit of inclining the head portion with respect to the trunk, wrong detection of the driving incapability state of the driver can be suppressed.

When the facial orientation with respect to the front of the vehicle 10 is larger than the threshold Th2 for the time T2 or more, the facial orientation is more likely to collapse due to a sudden illness than looking-aside. Accordingly, by detecting that the driver is incapable of driving in such a case, the driving incapability state of the driver can be detected with high accuracy.

When the facial orientation with respect to the front of the vehicle 10 is larger than the threshold Th2, and the driver takes his/her hands off the steering wheel 15, the facial orientation is more likely to collapse due to a sudden illness than looking-aside. Therefore, by detecting that the driver is incapable of driving in such a case, the driving incapability state of the driver can be detected with high accuracy.

When the facial orientation with respect to the front of the vehicle 10 is larger than the threshold Th2, and the accelerator opening is larger than the predetermined opening, the facial orientation is more likely to collapse due to a sudden illness than looking-aside. Accordingly, by detecting that the driver is incapable of driving in such a case, the driving incapability state of the driver can be detected with high accuracy.

When the facial orientation with respect to the front of the vehicle 10 is larger than the threshold Th2, and the accelerator and the brake are not operated for a time that is longer than the time T3, the facial orientation is more likely to collapse due to a sudden illness than looking-aside. Accordingly, by detecting that the driver is incapable of driving in such a case, the driving incapability state of the driver can be detected with high accuracy.

In general, when the driver is capable of driving, the steering wheel is operated within the time T3. Thus, by setting the condition that the steering wheel is not operated for a time that is longer than the time T3, wrong detection of the driving incapability state of the driver can be suppressed.

In general, when the driver is capable of driving, the driver never continues to largely press the accelerator for a time that is longer than the time T3. Thus, by setting the condition that the accelerator opening is larger than the predetermined opening for a time that is longer than the time T3, wrong detection of the driving incapability state of the driver can be suppressed.

During travelling, when the driver intentionally changes the facial orientation from the front of the vehicle 10, the driver probably would turn his/her face ahead. Thus, by setting that the facial orientation toward the front of the vehicle 10 is larger than the threshold Th2 for the time T2 or more, wrong detection of the driving incapability state of the driver can be suppressed.

In general, when the driver has a sudden illness, the driver is not put into the driving incapability state with his/her hand being higher than his/her neck. Thus, by setting the condition that the driver's hand is lower than the driver's neck, wrong detection of the driving incapability state of the driver can be suppressed.

In a period taken until the time T5 elapses after application of an external force to the vehicle, by detecting that the driver is incapable of driving on condition that the amplitude of swing of the head portion is smaller than the amplitude Am1 or larger than the amplitude Am2, the driving incapability state of the driver can be readily detected.

In general, when the driver is unconscious, the head portion vibrates according to the external force. Then, when the effect of the external force is lost, the head portion becomes stationary. On the contrary, when the driver vibrates the head portion by habit, the head portion vibrates irrespective of the effect of the external force. Thus, by setting the condition that the head portion vibrates according to the external force, and the position of the head portion does not change after loss of the effect of the external force, wrong detection of the driving incapability state of the driver can be suppressed.

By setting the condition that the detected amplitude of swing of the head portion is larger than the learned amplitude of swing of the head portion by a value exceeding a determination value D2, even when the driver has a habit of swinging the head, wrong detection of the driving incapability state of the driver can be suppressed.

When the white-of-eye state is detected, by detecting that the driver is incapable of driving, driving incapability state of the driver can be detected with high accuracy.

The eye outline and the black-of-eye region of the driver are detected based on the image. Then, the white-of-eye degree is calculated based on the detected eye outline and black-of-eye region, and on condition that the white-of-eye degree is larger than the threshold Th3, it is detected that the driver is incapable of driving. Thus, the white-of-eye state of the driver can be detected with high accuracy, and the driving incapability state of the driver can be detected with high accuracy.

In the state where the driver is capable of driving, even when the driver turns his/her eye upward to temporarily increase the white-of-eye degree, the white-of-eye degree does not remain large. Thus, by setting the condition that the white-of-eye degree is larger than the threshold Th3 for a time T4 or more, wrong detection of the driving incapability state of the driver can be suppressed.

By setting the condition that the white-of-eye degree of each of eyes is larger than the threshold Th3, even when the white-of-eye state is wrongly detected since the driver puts a bandage on one eye, or one eye is an artificial eye, the driving incapability state of the driver is not detected in the case where the driver does not show the white of the other eye. Thus, wrong detection of the driving incapability state of the driver can be suppressed.

Since the ratio of the longitudinal length Lb of the black-of-eye region to the longitudinal length Lw+Lb of the eye correlates with the proportion of the white-of-eye region to the entire region of the eye, the white-of-eye degree can be calculated from the ratio of the longitudinal length Lb of the black-of-eye region to the longitudinal length Lw+Lb of the eye.

As the distance Lb between the top of the eye outline and the bottom of the black-of-eye region is smaller, the white-of-eye degree becomes larger. Thus, the white-of-eye degree can be calculated from the distance Lb between the top of the eye outline and the bottom of the black-of-eye region.

The white-of-eye degree can be calculated from the ratio of the area of the white-of-eye region to the area of the black-of-eye region.

In the white-of-eye state, the black-of-eye region is oriented upward and thus, the oblateness of the black-of-eye region becomes apparently large. Thus, the white-of-eye degree can be calculated from the oblateness of the black-of-eye region.

As the distance Lc between the longitudinal central line of the entire eye and the bottom of the black-of-eye region is larger, the black-of-eye region becomes smaller, and the white-of-eye degree becomes larger. Thus, the white-of-eye degree can be calculated from the distance Lc between the central line and the bottom of the black-of-eye region.

In general, the probability that the driver is put into the driving incapability state is higher when the driver has a spasm than when the driver has no spasm. Thus, when a spasm is detected, by decreasing the thresholds Th1, Th2, the driving incapability state of the driver can be detected more readily.

By decreasing the times T0, T1, T2, and T4 as the vehicle speed is higher, time required to determine the driving incapability state of the driver can be decreased as the vehicle speed is higher, starting suitable vehicle control earlier.

By decreasing the times T0, T1, T2, and T4 as the TTC decreases, time required to determine the driving incapability state of the driver can be decreased as the TTC decreases, starting suitable vehicle control earlier.

By setting the times T0, T1, T2, and T4 based on personal information including a medical history and age of the driver, time required to determine the driving incapability state can be set according to characteristics of each driver.

In the case where drive assistance control is made in the vehicle, wrong detection of the driving incapability state can be suppressed by extending the times T0, T1, and T2.

By notifying the collapse degree of the driver's posture to the driver, the driver can recognize the own posture. For this reason, even when the driving posture collapses, the driver can correct the posture so as not to detect the driving incapability state. This can suppress wrong detection of the driving incapability state.

By inquiring the driver whether the driver is incapable of driving when the driving incapability state of the driver is detected, when the driving incapability state of the driver is wrongly detected, vehicle control to safely stop the vehicle can be avoided.

First Modification of First Embodiment

Figure 19:
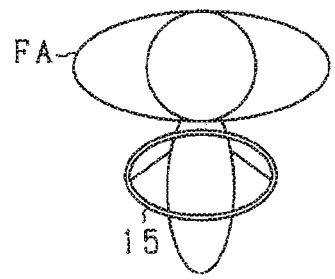
FIG. 19 is a view illustrating a frame scope of out-of-frame determination in a first modification.

In determination of the out-of-frame state by the out-of-frame state detection portion 71, the predetermined scope FA may be elliptical as illustrated in FIG. 19. The ellipse has a major axis along the width of the vehicle 10 and a minor axis along the height of the vehicle 10.

Considering multiple movements of the head portion of the driver during driving, the head portion of the driver moves to right and left when the vehicle turns right and left, and the head portion of the driver moves in the elliptical scope having a major axis in the leftward-rightward direction. Thus, by making the scope FA elliptical, even when the driver moves the head portion at a normal operation, wrong detection of the driving incapability state can be suppressed.

Second Modification of First Embodiment

The detection apparatus 100 may include a deformation portion that deforms the scope FA according to the intention of the user including the driver, or driver information on the driver. The deformation portion may be embodied as a function of the state detection portion 70. Deformation includes extension, contraction, and shape change of the scope FA. The deformation portion deforms the scope FA according to an input of the user to the HMI 80. The HMI 80 may include an extension switch and a contraction switch, and the display 81 may be a touch display.

Figure 20:
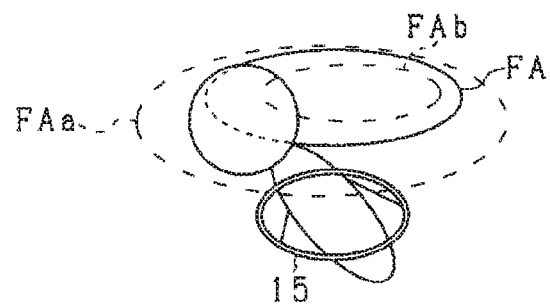
FIG. 20 is a view illustrating a frame scope of out-of-frame determination in a second modification.

As illustrated in FIG. 20, when the driver has a habit of displacing the driving posture from a standard position, or detection of the driving incapability state is made difficult, the driver may operate an extension switch or the like to extend the scope FA to a scope FAa.

In the case where the driver is an aged person or a person having a chronic illness, to detect the driving incapability state more readily, the driver and the driver's family may operate a contraction switch or the like to contract the scope FA to a scope FAb. In the case where the driver is a driver of a bus or taxi, to detect the driving incapability state more readily, an administrator of the bus or taxi may operate the contraction switch or the like to contract the scope FA to the scope FAb. In FIG. 20, the scopes FA, FAa, and FAb are elliptical and however, may be rectangular.

Irrespective of the intention of the user, the deformation portion may extend or contract the scope FA according to driver information. The driver information includes at least one of age, a medical history, and a habit of the driving posture of the driver, and stores in the storage device 52. The habit of the driving posture may be learned from the head portion of the driver by the learning portion 51, or may be registered by previously imaging the driving posture by the driver.

For example, the deformation portion extends the scope FA to the scope FAa when the driver has a habit of the driving posture, and contracts the scope FA to the scope FAb when the driver is an aged person or a person having a medical history. The deformation portion may extend or contract the scope FA according to vehicle speed, TTC, and presence/absence of drive assistance control, or may contract the scope FA in day of week or time frame when a sudden illness such as heart attack occurs statically frequently.

The deformation portion changes the scope FA according to at least one of the intention of the user and driver information, and may change the scope FA according to both of the intention of the user and driver information. The deformation portion may either extend or contract the scope FA. The deformation portion may deform the scope FA according to the intention of the user or driver information.

By deforming the scope FA in this manner according to the intention of the user or driver information, the driving incapability state can be detected according to the intention of the user or driver information. For example, when the possibility of the driving incapability state is high, the driving incapability state may be readily to be detected. When the driver has a habit of displacing the driving posture from the standard position, by deforming the scope FA according to the habit, wrong detection of the driving incapability state can be suppressed.

Third Modification of First Embodiment

The detection apparatus 100 includes a transfer portion that transfers the scope FA on an image according to the intention of the user including the driver, or driver information on the driver. The transfer portion may be embodied as a function of the state detection portion 70. The transfer portion moves the scope FA according to an input to the HMI 80 by the user, for example, drag on the touch display. That is, this modification is different from the second modification in that the scope FA is moved in place of deforming the scope FA, according to the intention of the user or driver information.

Figure 21:
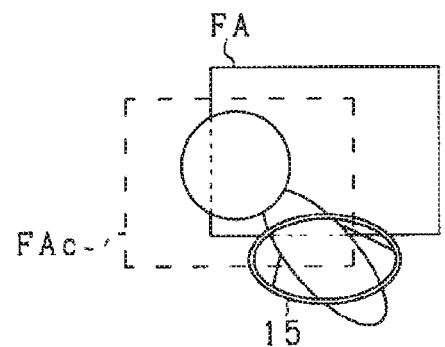
FIG. 21 is a view illustrating a frame scope of out-of-frame determination in a third modification.

As illustrated in FIG. 21, when the driver has a habit of displacing the driving posture from the standard position, by moving the scope FA to a scope FAc according to the habit, wrong detection of the driving incapability state can be suppressed. In FIG. 21, the scope FA is rectangular and however, may be elliptical. The second modification may be combined with the third modification to move the scope FA as well as deform the scope FA.

Fourth Modification of First Embodiment

Figure 22:
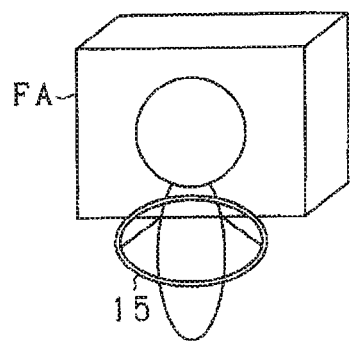
FIG. 22 is a view illustrating a frame scope of out-of-frame determination in a fourth modification.

The driver cameras 21 include a stereo camera. As illustrated in FIG. 22, the scope FA is a three-dimensional scope that extends in the width direction and forward-rearward direction of the vehicle 10. For example, the stereo cameras are installed at right and left ends of the rear view mirror 16. The shape of the scope FA is not limited to a cube, and may be an oval sphere. When the scope FA is an oval sphere, a major axis of the oval sphere extends along the width of the vehicle 10. The second modification or the third modification may be applied to the fourth modification.

The stereo camera can three-dimensionally acquire the position of the head portion of the driver. That is, the position of the head portion in the width direction of the vehicle 10 as well as the position of the head portion in the forward-rearward direction can be acquired. Thus, by setting the scope FA in the three-dimensional way, even when the driver is incapable of driving and falls laterally, or the driver is incapable of driving and falls forward, the driving incapability state of the driver can be detected by out-of-frame state determination.

Second Embodiment

A difference between a detection apparatus 100 in accordance with Second embodiment and the detection apparatus 100 in accordance with First embodiment will be described below. The detection apparatus 100 in accordance with Second embodiment is different from the detection apparatus 100 in accordance with First embodiment in the way of determining the out-of-frame state by the out-of-frame state detection portion 71.

In this embodiment, the out-of-frame state detection portion 71 sets three scopes: a scope FA1 (a first predetermined scope), a scope FA2 (a second predetermined scope), and a scope FA3, as the scope FA that is a predetermined scope in out-of-frame state determination. The scope FA1 is the smallest scope. The scope FA2 includes a scope that is larger than the scope FA1, and includes the FA1 and the scope outer from the scope FA1 (end side of the image). The scope FA3 includes a scope that is larger than the scope FA2, and includes the scope FA2 and the scope outer from the scope FA2. In this embodiment, the scope FA1, the scope FA2, and the scope FA3 have the common center. In this embodiment, three scopes are set as the predetermined scope in out-of-frame state determination, but at least two scopes may be set.

The out-of-frame state detection portion 71 sets the out-of-frame determination time for each predetermined scope. That is, the out-of-frame state detection portion 71 sets, as the out-of-frame determination time, the times T01, T02, and T03 for the scope FA1, the scope FA2, and the scope FA3, respectively.

The out-of-frame state detection portion 71 detects that the driver is incapable of driving, on condition that the head portion of the driver falls outside at least one predetermined scope for the out-of-frame determination time corresponding to the predetermined scope or more.

That is, in this embodiment, there are three conditions: (1) the head portion of the driver falls outside the scope FA1 for the time T01 or more; (2) the head portion of the driver falls outside the scope FA2 for the time T02 or more, and (3) the head portion of the driver falls outside the scope FA3 for the time T03 or more. When at least one of the three conditions (1) to (3) is satisfied, the out-of-frame state detection portion 71 detects that the driver is incapable of driving.

Figure 16A:
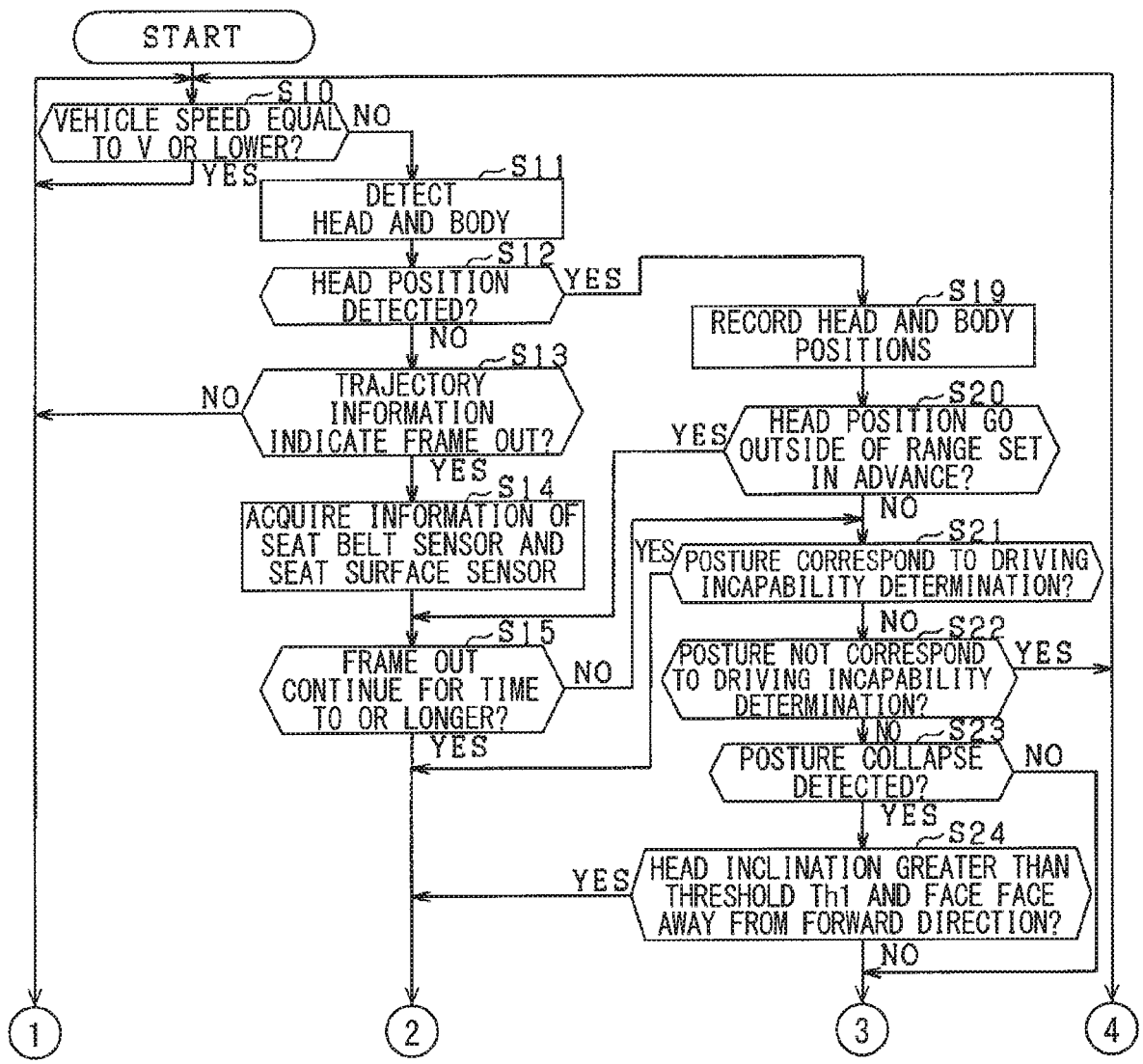
FIG. 16A is a flowchart illustrating a processing procedure of detecting the driving incapability state.
Figure 16B:
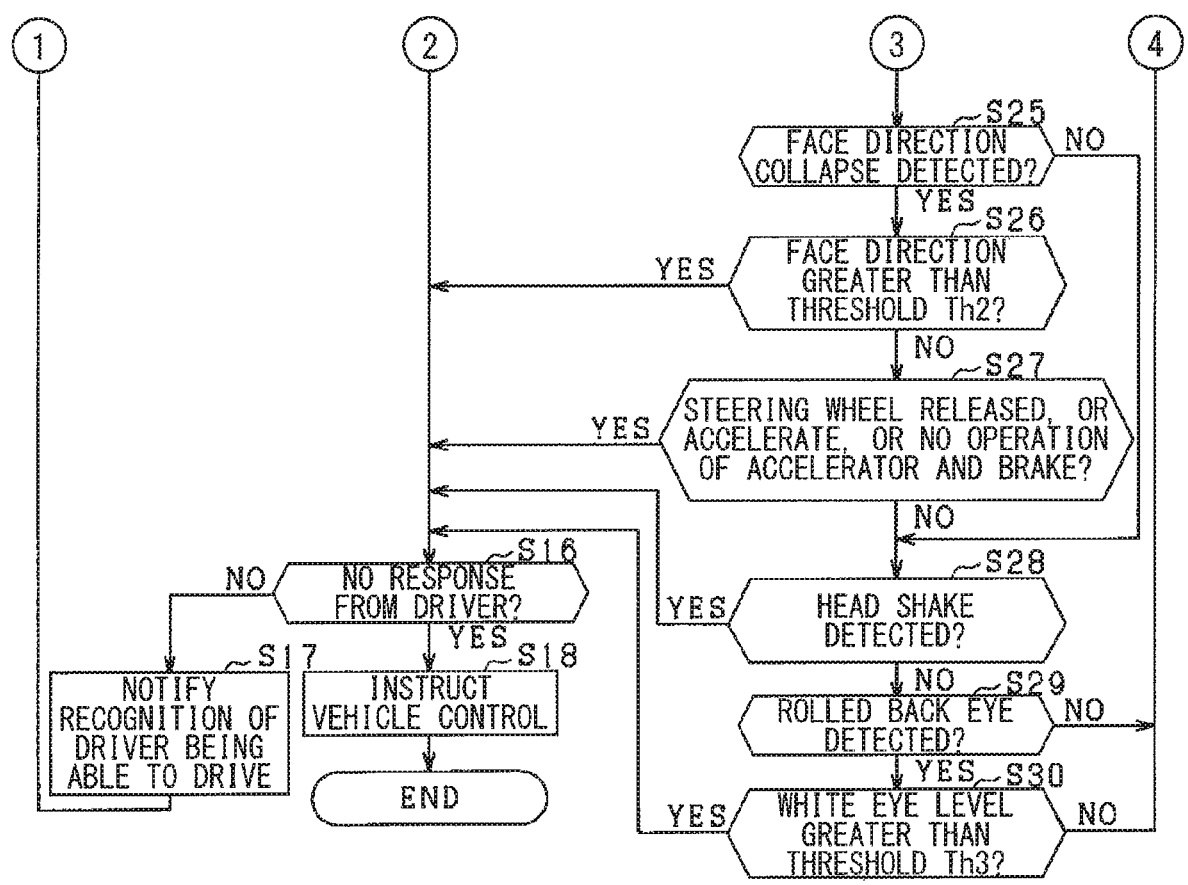
FIG. 16B is a flowchart illustrating a continuation of FIG. 16A and a processing procedure of detecting the driving incapability state.

Thus, in flowcharts of FIG. 16A and FIG. 16B, it is determined whether at least one of the three conditions (1) to (3) is satisfied in place of determining whether the head portion continuously falls outside the scope FA for the time T0 or more in the processing in S15. When the at least one condition is satisfied, the procedure proceeds to the processing in S16, and when none of the three conditions is satisfied, the procedure proceeds to processing in S21.

In general, when the driver picks up an object located away from the driver seat, for a safety reason, as the driver is away from the normal driving position, a stay time is decreased. Then, the out-of-frame state detection portion 71 sets the out-of-frame determination time set to be shorter as the predetermined scope is larger. That is, the out-of-frame state detection portion 71 sets the out-of-frame determination time to achieve the time T01>the time T02>the time T03.

For example, in the case where the time T01 is set to three seconds, and the time T02 is set to 1 second, even when three seconds do not elapse after the head portion of the driver falls outside the scope FA1, at the time when one second elapses after the head portion of the driver falls outside the scope FA2, the driving incapability state of the driver is detected.

Like the time T0, the times T01, T02, and T03 are set based on personal information registered in the storage device 52, and are changed according to vehicle speed, TTC, and presence/absence of execution of drive assistance control. Further, like the time T0, the times T01, T02, and T03 may be decreased in day of week or time frame when a sudden illness such as heart attack occurs statically frequently. Furthermore, like the time T0, the times T01, T02, and T03 may be decreased according to the amplitude of the position of the head portion, the moving speed of the head portion, and detection of spasm.

Figure 23:
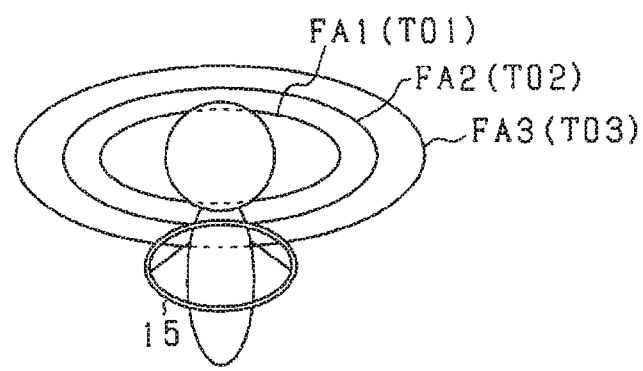
FIG. 23 is a view illustrating frame scope and determination time in out-of-frame determination in a second embodiment.

In FIG. 23, the scope FA1, the scope FA2, and the scope FA3 are elliptical. However, the scope FA1, the scope FA2, and the scope FA3 may be rectangular. Further, the second modification or the third modification of First embodiment may be applied to deform or move each of the scope FA1, the scope FA2, and the scope FA3. The fourth modification of First embodiment may be applied to three-dimensionally set the scope FA1, the scope FA2, and the scope FA3.

In Second embodiment described above, multiple predetermined scopes of different sizes and the same center are set, and the out-of-frame determination time is set for each predetermined scope. That is, the out-of-frame determination time is set according to the deviation degree from the normal driving position. Thus, the driving incapability state of the driver can be detected according to the deviation degree from the normal driving position.

Since the out-of-frame determination time is set to be shorter as the deviation degree from the normal driving position is larger, wrong detection of the driving incapability state can be suppressed, and the driving incapability state of the driver can be early detected.

Other Embodiments

The driver cameras 21 may be one of the four cameras mounted in a vehicle compartment. At least one driver camera 21 may be provided.

The out-of-frame state detection portion 71 may detect that the driver is incapable of driving based on the trajectory acquired by the trajectory acquisition portion 62. When the driver has a sudden illness and is incapable of driving, the head portion of the driver often moves from a position at driving, and does not return to the position at driving and therefore, the driving incapability state of the driver can be detected based on the trajectory of the head portion.

The orientation collapse state detection portion 73 may further detect that the driver is incapable of driving, when the driver's face is oriented downward further than a threshold Th2d (a downward threshold), or is oriented upward further than a threshold Th2u (an upward threshold). In general, when the driver has a sudden illness and becomes unconscious, the driver's face is often oriented downward further than the threshold Th2d, oriented upward further than the threshold Th2u. Thus, when the driver's facial orientation is largely oriented downward or upward, it is determined that the driver is incapable of driving.

The swing state detection portion 74 may detect that the driver is incapable of driving, on condition that, during travelling of the vehicle 10, at application of an external force to the vehicle 10, the head portion detected by the head detection portion 61 is inclined in the direction of the external force for a time T6 (a return determination time) or more. Normally, when the driver is conscious, even if, at application of the external force (specifically, rightward-leftward and forward-rearward external force) to the vehicle 10, the head portion of the driver is inclined in the direction of the external force, the head portion returns to the original position within the time T6. On the contrary, when the driver has a sudden illness and becomes unconscious, the head portion of the driver has a low resistance to an external force, and remains inclined in the direction of the external force for the time T6 or more. Thus, the swing state detection portion 74 can detect the driving incapability state of the driver in the above-described case.

When the opening of the mouth (specifically, longitudinal opening), which is detected by the facial expression detection portion 67, is larger than an opening determination amount, the white-of-eye state calculation portion 75 may further detect that the driver is incapable of driving. When the driver has a sudden illness and shows the whites of his/her eyes, the driver tends to open his/her mouth. Thus, the driving incapability state of the driver may be detected when the opening of the mouth of the driver is larger than an opening determination amount.

Although all of out-of-frame determination, posture collapse determination, facial orientation collapse determination, swing state determination, and white-of-eye state determination are performed, achieving the highest accuracy of detecting the driving incapability state of the driver, at least one of the above-mentioned determinations may be performed. Any number of determinations may be performed. In this case, out-of-frame determination, posture collapse determination, facial orientation collapse determination, swing state determination, white-of-eye state determination may be performed in this order.

For example, in the case of combining the posture collapse determination with the swing state determination, by performing the swing state determination when the driving incapability state of the driver is not detected in the posture collapse determination, the driving incapability state of the driver can be detected with high accuracy.

In the case of combining the facial orientation collapse determination with the swing state determination, by performing the swing state determination when the driving incapability state of the driver is not detected in the facial orientation collapse determination, the driving incapability state of the driver can be detected with high accuracy.

In the case of combining the swing state determination with the white-of-eye state determination, by performing the white-of-eye state determination when the driving incapability state of the driver is not detected in the swing state determination, the driving incapability state of the driver can be detected with high accuracy.

The learning portion 51 may learn the driver's posture taken when wrongly detecting that the driver is incapable of driving. That is, the driver's posture taken when the driving incapability state is detected, but the drivers makes a response may be learned. Then, the learned posture may be the posture that is not determined as the driving incapability state.

Statistical values of each threshold and each determination value may be stored in the storage device 52, and may be used as initial values. The statistical values of each threshold and each determination value are statistical values of each threshold and each determination value for the driver of each of multiple vehicles. The vehicle 10 may transmit each threshold and each determination value that are set for the driver to an information center, and the information center may compile statistics on the values.

When the driver may be inquired about the driving incapability state, and makes a response, it is recognized that the driver is capable of driving for a certain time after the response. The processing of detecting the driving incapability state of the driver may be executed at a time interval set by the driver (for example, once per one hour).

The external force applied to the vehicle 10 may be detected by any component other than the G sensor 44, for example, the seat face sensor 23.

From a first aspect, apparatus detecting driving incapability state of a driver includes a head detection portion that successively detects a head portion, which is higher than a neck of the driver, based on an image of a driver seat captured by an imaging device mounted in a vehicle, and an out-of-frame state detection portion that, when the head portion detected by the head detection portion is out of a predetermined scope in the image during travelling of the vehicle, detects that the driver is incapable of driving.

The apparatus detecting driving incapability state of a driver sequentially detects a head portion of the driver based on a captured image of a driver seat. When the driver normally drives the vehicle, the head portion of the driver tends to fall within the predetermined scope of the image of the driver seat. On the contrary, when the driver becomes unconscious due to a sudden illness, the head portion of the driver may be out of the predetermined scope. Therefore, the driving incapability state of the driver can be easily detected by detecting that the driver is incapable of driving when the head portion falls outside the predetermined scope.

From a second aspect, apparatus detecting driving incapability state of a driver includes a head detection portion that successively detects a head portion, which is higher than a neck of the driver, based on an image of a driver seat captured by an imaging device mounted in a vehicle, a trajectory acquisition portion that acquires the trajectory of the head portion from positions of the head portion detected by the head detection portion, and a state detection portion that detects the driver is incapable of driving based on the trajectory acquired by the trajectory acquisition portion.

The apparatus detecting driving incapability state of a driver successively detects the head portion of the driver based on the image of the driver seat, and acquires a trajectory of the head portion from positions of the detected head portion. When the driver becomes incapable of driving due to a sudden illness, the head portion of the driver often displaces from a position at driving, and does not return to the position at driving. Therefore, the driving incapability state of the driver can be readily detected based on the trajectory of the head portion of the driver.

It is noted that a flowchart or the processing of the flowchart in the present application includes multiple steps (also referred to as sections), each of which is represented, for instance, as S10. Further, each step can be divided into several sub-steps while several steps can be combined into a single step.

While various embodiments, configurations, and aspects of the apparatus detecting driving incapability state of a driver have been exemplified, the embodiments, configurations, and aspects of the apparatus detecting driving incapability state of a driver are not limited to those described above. For example, embodiments, configurations, and aspects obtained from an appropriate combination of technical elements disclosed in different embodiments, configurations, and aspects are also included within the scope of the embodiments, configurations, and aspects of the apparatus detecting driving incapability state of a driver.

The invention claimed is:

1. An apparatus for detecting a driving incapability state of a driver of a vehicle, the apparatus comprising:
a computer including a processor and a memory,
the computer is configured to:
three-dimensionally detect a position of a head portion of
the driver based on an image of a driver seat captured by an imaging device mounted in the vehicle, wherein the head portion of the driver is higher than a neck of the driver;

detect a facial orientation of the driver with respect to a front of the vehicle based on the image of the driver seat; and detect that the driver is incapable of driving, when, during traveling of the vehicle, (i) the detected position of the head portion of the driver is out of a predetermined three-dimensional scope and (ii) the detected facial orientation of the driver with respect to the front of the vehicle is oriented downward further than a threshold.

2. The apparatus according to claim 1, wherein the computer detects that the driver is incapable of driving, when, during the traveling of the vehicle, (i) the detected position of the head portion of the driver is out of the predetermined three-dimensional scope over an out-of-frame determination time and (ii) the detected facial orientation of the driver with respect to the front of the vehicle is oriented downward further than the threshold over an orientation collapse determination time.

3. An apparatus for detecting a driving incapability state of a driver of a vehicle, the apparatus comprising:

a computer including a processor and a memory, the computer is configured to:

three-dimensionally detect a position of a head portion of the driver based on an image of a driver seat captured by an imaging device mounted in the vehicle, wherein the head portion of the driver is higher than a neck of the driver;

detect a facial orientation of the driver with respect to a front of the vehicle based on the image of the driver seat; and detect that the driver is incapable of driving, when, during traveling of the vehicle, (i) the detected position of the head portion of the driver is out of a predetermined three-dimensional scope and (ii) the detected facial orientation of the driver with respect to the front of the vehicle is oriented upward further than a threshold.

4. The apparatus according to claim 3, wherein the computer detects that the driver is incapable of driving, when, during the traveling of the vehicle, (i) the detected position of the head portion of the driver is out of the predetermined three-dimensional scope over an out-of-frame determination time and (ii) the detected facial orientation of the driver with respect to the front of the vehicle is oriented upward further than the threshold over an orientation collapse determination time.

5. A method for detecting a driving incapability state of a driver of a vehicle, the method comprising:

capturing, by a camera, a driver seat of the vehicle;

three-dimensionally detecting, by a processor, a position of a head portion of the driver higher than a neck of the driver based on an image of the driver seat captured by the camera;

detecting, by the processor, a facial orientation of the driver with respect to a front of the vehicle based on the image of the driver seat; and detecting, by the processor, that the driver is incapable of driving, when, during traveling of the vehicle, (i) the detected position of the head portion of the driver is out of a predetermined three-dimensional scope and (ii) the detected facial orientation of the driver with respect to the front of the vehicle is oriented downward further than a threshold.

6. The method according to claim 5, wherein:

when, during the traveling of the vehicle, (i) the detected position of the head portion of the driver is out of the predetermined three-dimensional scope over an out-of-frame determination time and (ii) the detected facial orientation of the driver with respect to the front of the vehicle is oriented downward further than the threshold over an orientation collapse determination time, it is detected that the driver is incapable of driving.

7. A method for detecting a driving incapability state of a driver of a vehicle, the method comprising:

capturing, by a camera, a driver seat of the vehicle;

three-dimensionally detecting, by a processor, a position of a head portion of the driver higher than a neck of the driver based on an image of the driver seat captured by the camera;

detecting, by the processor, a facial orientation of the driver with respect to a front of the vehicle based on the image of the driver seat; and detecting, by the processor, that the driver is incapable of driving, when, during traveling of the vehicle, (i) the detected position of the head portion of the driver is out of a predetermined three-dimensional scope and (ii) the detected facial orientation of the driver with respect to the front of the vehicle is oriented upward further than a threshold.

8. The method according to claim 7, wherein when, during the traveling of the vehicle, (i) the detected position of the head portion of the driver is out of the predetermined three-dimensional scope over an out-of-frame determination time and (ii) the detected facial orientation of the driver with respect to the front of the vehicle is oriented upward further than the threshold over an orientation collapse determination time, it is detected that the driver is incapable of driving.

\* \* \* \* \*